(12) United States Patent
Jolliff et al.

(10) Patent No.: US 7,089,644 B2
(45) Date of Patent: Aug. 15, 2006

(54) METHOD FOR MANUFACTURING TRANSAXLES

(75) Inventors: Norman E Jolliff, Salem, IN (US); Richard T Ruebusch, New Albany, IN (US); Gordon C Dowen, Salem, IN (US); Gary G. Twaddle, Salem, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 10/897,773

(22) Filed: Jul. 23, 2004

(65) Prior Publication Data

US 2005/0003920 A1 Jan. 6, 2005

Related U.S. Application Data

(62) Division of application No. 10/137,759, filed on May 2, 2002, now Pat. No. 6,817,960, which is a division of application No. 09/498,692, filed on Feb. 7, 2000, now Pat. No. 6,422,109.

(60) Provisional application No. 60/145,619, filed on Jul. 26, 1999, provisional application No. 60/119,381, filed on Feb. 9, 1999.

(51) Int. Cl.
*B23P 21/00* (2006.01)

(52) U.S. Cl. .............................. 29/469; 29/428; 475/83

(58) Field of Classification Search .................. 29/428, 29/469; 475/83, 198; 74/606 R, 730.1
See application file for complete search history.

(56) References Cited

U.S. PATENT DOCUMENTS

| | | | |
|---|---|---|---|
| 3,504,776 A | 4/1970 | Misenti | 192/55 |
| 4,185,713 A | 1/1980 | Williams et al. | 180/242 |
| 4,513,834 A | 4/1985 | Hayashi et al. | 170/70.1 |
| 4,756,208 A | 7/1988 | Hayashi et al. | 74/700 |
| 4,781,259 A | 11/1988 | Yamaoka et al. | 180/75 |
| 4,784,013 A | 11/1988 | Yamaoka et al. | 74/606 |
| 4,856,368 A | 8/1989 | Fujisaki et al. | 74/606 R |
| 4,862,767 A | 9/1989 | Hauser | 74/687 |
| 4,870,820 A | 10/1989 | Nemoto | 60/487 |
| 4,891,943 A | 1/1990 | Okada | 60/464 |
| 4,893,524 A | 1/1990 | Ohashi et al. | 74/687 |
| 4,899,541 A | 2/1990 | Okada et al. | 60/464 |
| 4,914,907 A | 4/1990 | Okada | 60/487 |
| 4,932,209 A | 6/1990 | Okada et al. | 60/487 |
| 4,953,426 A | 9/1990 | Johnson | 747/606 R |
| 4,986,073 A | 1/1991 | Okada | 60/454 |
| 5,017,095 A | 5/1991 | Burgess et al. | 417/222 R |
| 5,031,403 A | 7/1991 | Okada | 60/464 |

(Continued)

*Primary Examiner*—John C. Hong
(74) *Attorney, Agent, or Firm*—Baker & Daniels

(57) ABSTRACT

A method of manufacturing a plurality of left hand control hydrostatic transaxles and a plurality of right hand controlled hydrostatic transaxles. The method includes the steps of: providing a plurality of substantially identical axle modules; providing a plurality of left hand controlled hydrostatic transmission modules adapted to connect to respective axle modules to form left hand controlled hydrostatic transaxles, and a plurality of right hand controlled hydrostatic transmission modules adapted to connect to respective axle modules to form right hand controlled hydrostatic transaxles; attaching the plurality of left hand controlled hydrostatic transmission modules to a first quantity of the plurality of substantially identical axle modules to form a plurality of left hand controlled hydrostatic transaxles; and attaching the plurality of right hand controlled hydrostatic transmission modules to a second quantity of the plurality of substantially identical axle modules to form a plurality of right hand controlled hydrostatic transaxles. In one form of the invention, the transmission module is aligned with the axle module by piloting the output means of the motor of a hydrostatic transmission module to the input drive of a reduction gear train of the transmission module.

1 Claim, 15 Drawing Sheets

U.S. PATENT DOCUMENTS

| | | | |
|---|---|---|---|
| 5,086,587 A | 2/1992 | Andrews | 49/395 |
| 5,156,576 A | 10/1992 | Johnson | 475/72 |
| 5,201,692 A | 4/1993 | Johnson et al. | 475/74 |
| 5,211,077 A | 5/1993 | Louis et al. | 174/606 R |
| 5,230,519 A | 7/1993 | Nishimura et al. | 475/83 |
| 5,289,738 A | 3/1994 | Szulczewski | 60/487 |
| 5,335,496 A | 8/1994 | Azuma et al. | 60/487 |
| 5,339,631 A | 8/1994 | Ohashi | 60/487 |
| 5,373,697 A | 12/1994 | Jolliff et al. | 60/454 |
| 5,377,487 A | 1/1995 | Azuma et al. | 60/487 |
| 5,392,670 A | 2/1995 | Hauser | 74/606 R |
| 5,505,279 A | 4/1996 | Louis et al. | 180/305 |
| 5,616,092 A | 4/1997 | Hauser et al. | 425/83 |
| 5,636,555 A | 6/1997 | Okada et al. | 747/606 R |
| 5,701,738 A | 12/1997 | Eberle et al. | 60/435 |
| 5,709,141 A | 1/1998 | Ohashi et al. | 92/12.2 |
| 5,743,144 A | 4/1998 | Krantz | 74/405 |
| 5,771,758 A | 6/1998 | Hauser | 74/606 R |
| 5,802,931 A | 9/1998 | Louis | 74/606 R |
| 5,803,523 A | 9/1998 | Clark et al. | 296/26.1 |
| 5,816,034 A | 10/1998 | Peter | 56/11.4 |
| 5,836,159 A | 11/1998 | Shimizu et al. | 60/487 |
| 5,894,783 A | 4/1999 | Hauser et al. | 92/12.2 |
| 5,913,950 A | 6/1999 | Matsufuji | 74/730.1 |
| 5,964,440 A | 10/1999 | An et al. | 248/316.2 |
| 5,967,927 A | 10/1999 | Imamura et al. | 475/83 |
| 5,979,270 A | 11/1999 | Thoma et al. | 475/83 |
| 6,247,381 B1 | 6/2001 | Toelke et al. | 74/512 |
| 6,422,109 B1 | 7/2002 | Jolliff et al. | 74/730.1 |
| 2002/0170384 A1* | 11/2002 | Boyer et al. | 74/730.1 |

* cited by examiner

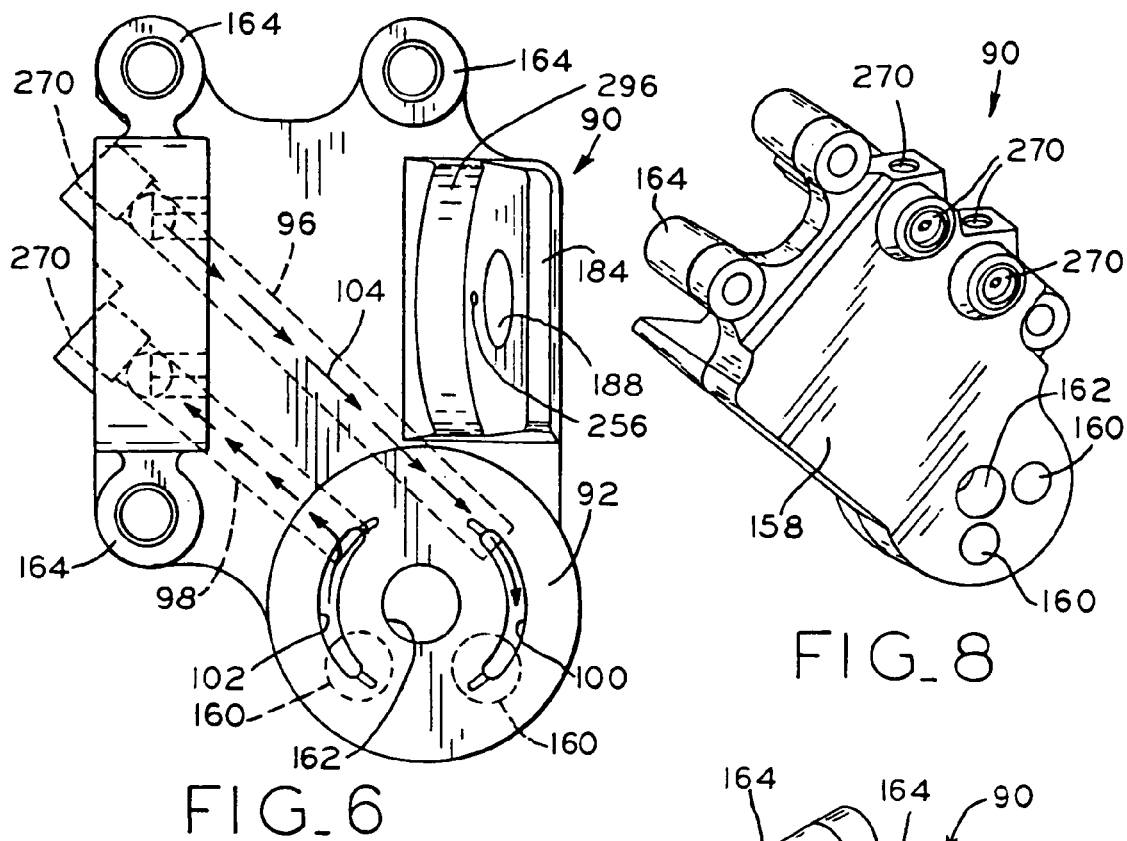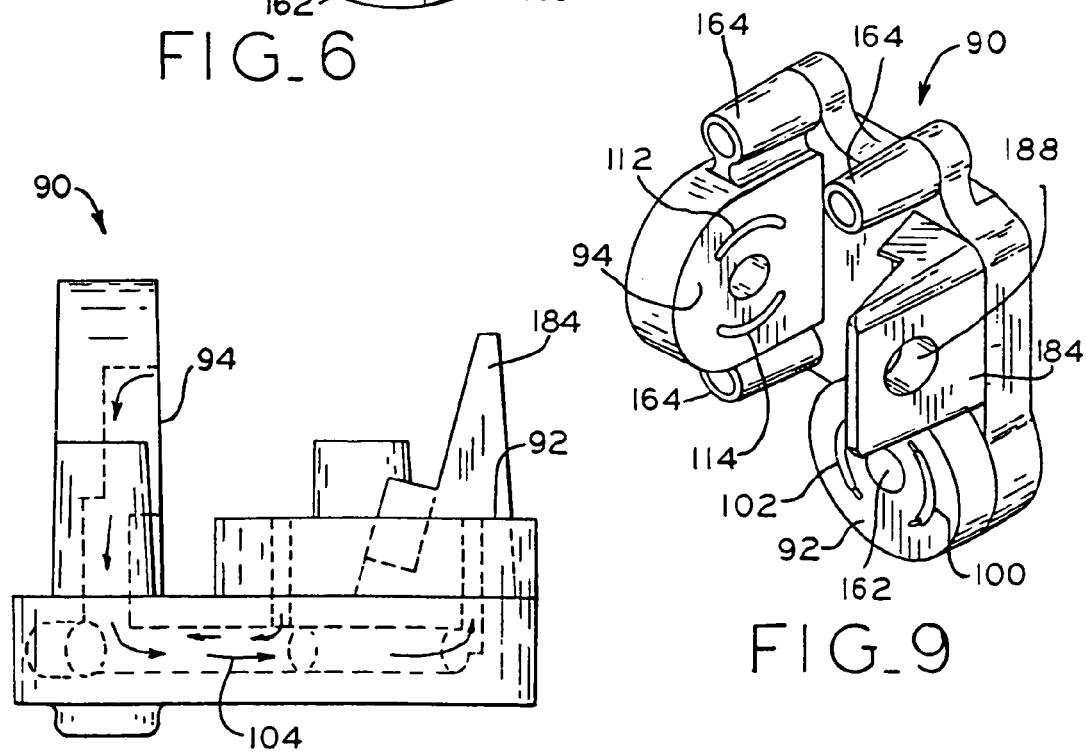

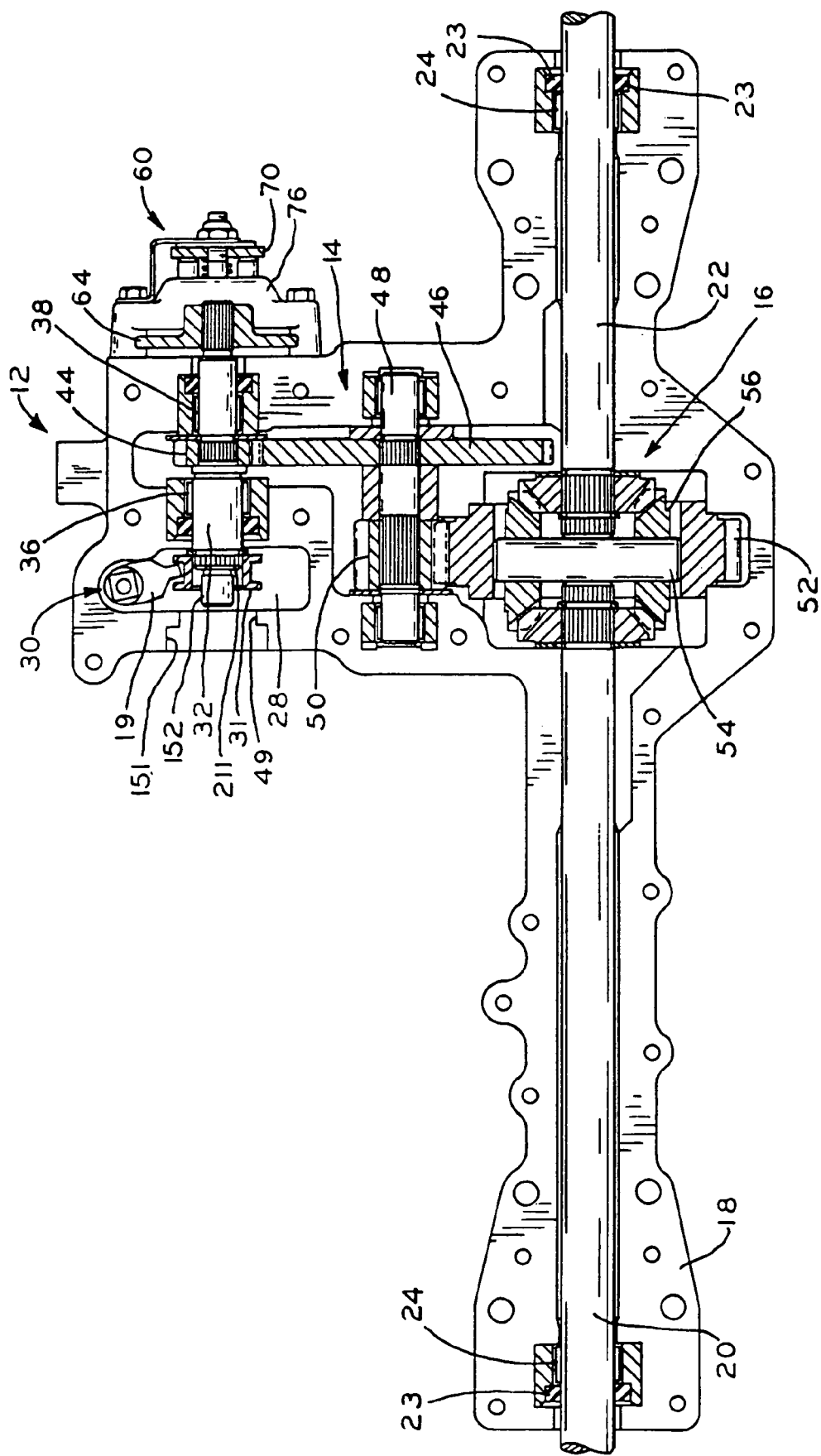
FIG_10

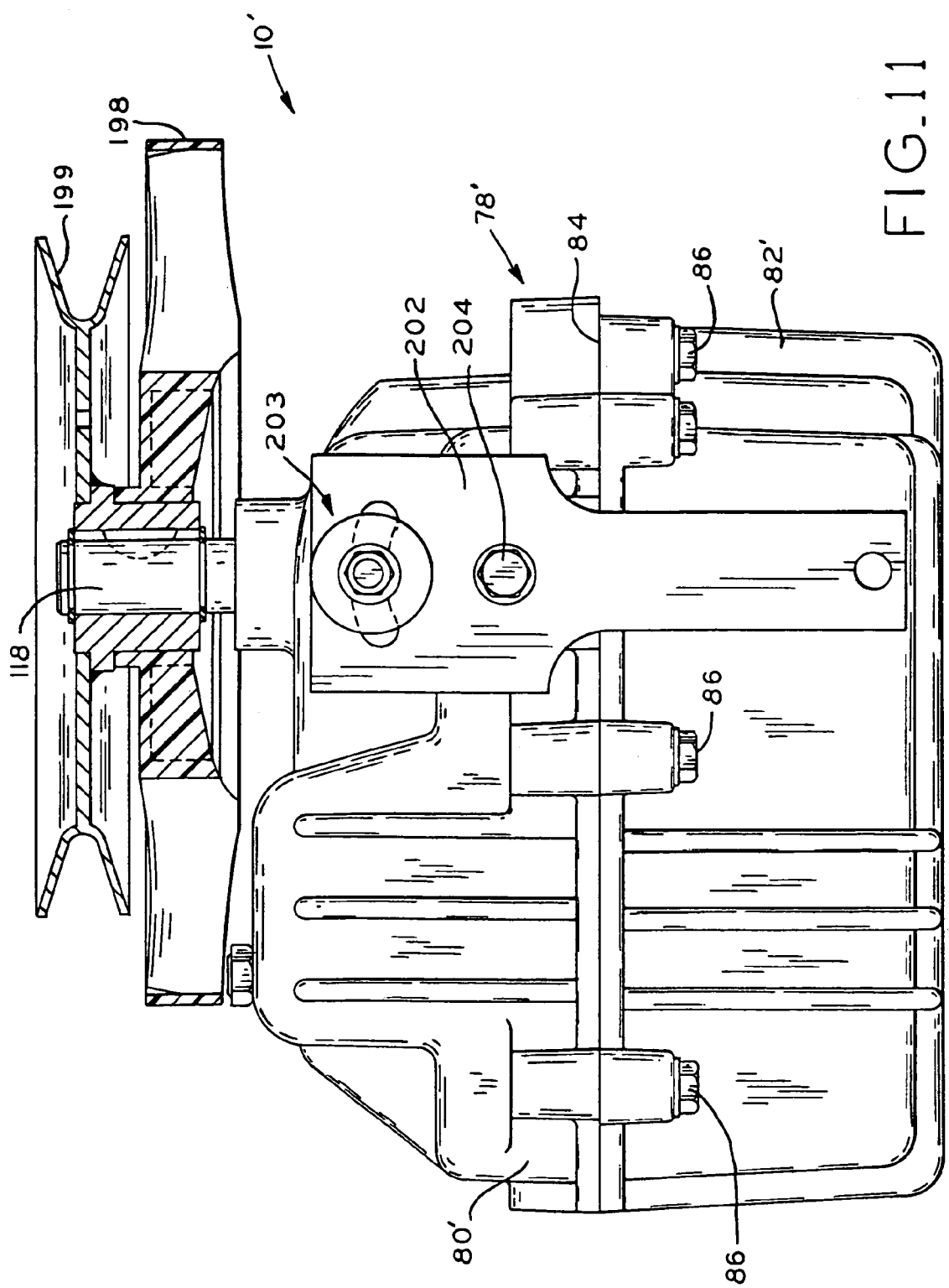

FIG_13

FIG_14

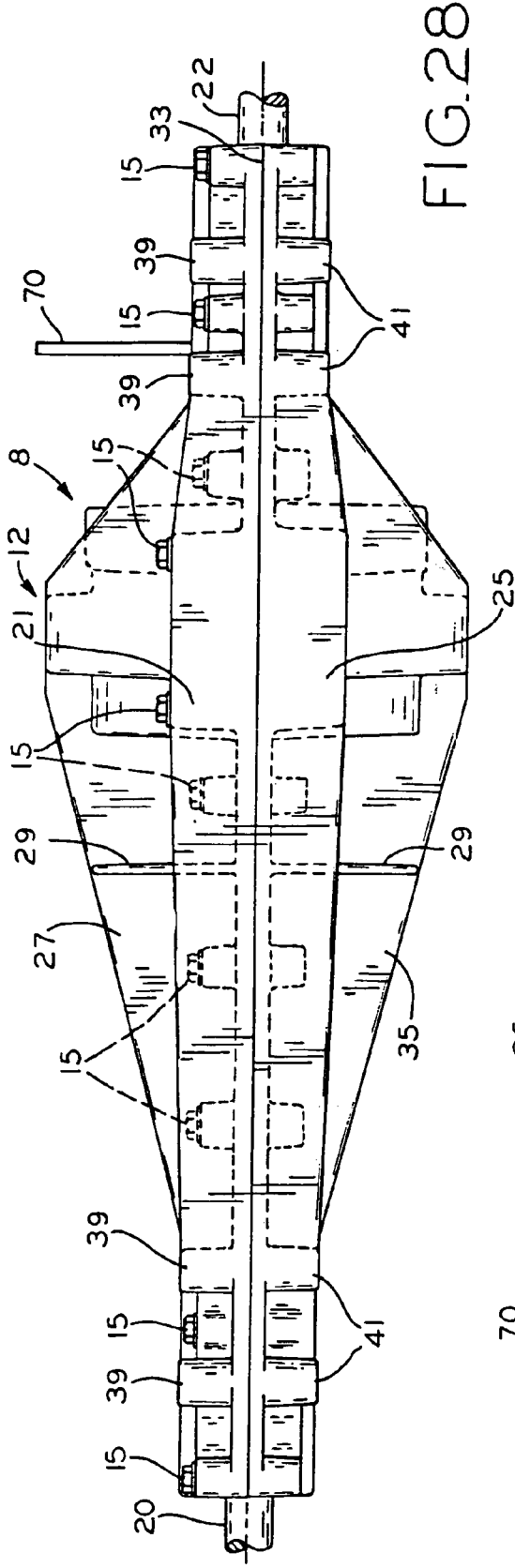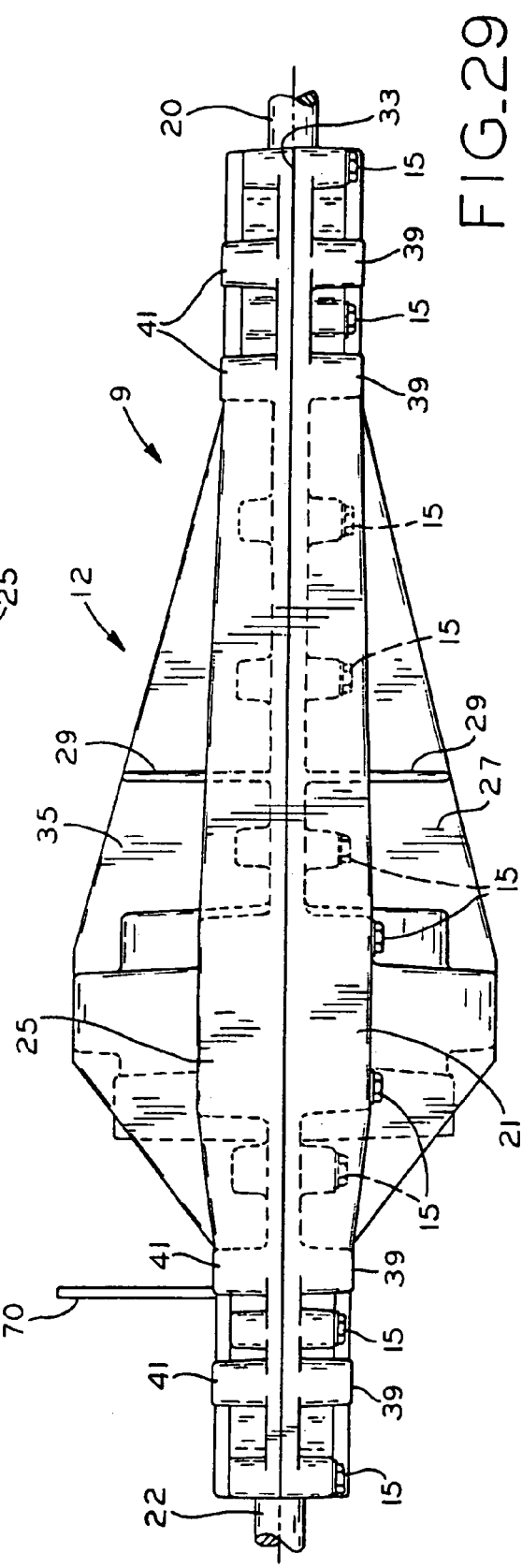

METHOD FOR MANUFACTURING TRANSAXLES

CROSS REFERENCE TO RELATED APPLICATIONS

This application is a division of application Ser. No. 10/137,759, filed May 2, 2002, now U.S. Pat. No. 6,817,960 which is a division of application Ser. No. 09/498,692, filed Feb. 7, 2000, and issued as U.S. Pat. No. 6,422,109 on Jul. 23, 2002, which application is related to and claims the benefit under 35 U.S.C. § 119(e) of the U.S. Provisional Applications 60/119,381 filed Feb. 9, 1999, and 60/145,619 filed Jul. 26, 1999, the disclosures of which are hereby expressly incorporated by reference herein.

BACKGROUND OF THE INVENTION

The present invention relates to hydrostatic transaxles intended primarily for use in the lawn and garden industry on riding lawnmowers, lawn and garden tractors and the like, but may also be applied to larger implements and vehicles.

Hydrostatic transmissions transmit rotary mechanical motion, typically from an internal combustion engine, to fluid motion, typically oil, and then back to rotary mechanical motion to rotate a pair of drive axles in order to drive the vehicle. The hydrostatic transmission controls the output rotary mechanical motion such that varying output speeds in the forward and reverse directions are possible with a single speed input rotary mechanical motion. Such transmissions have utilized radial piston pumps and motors, axial piston pumps and motors and hybrid transmissions wherein the pump may be of the radial piston design, for example, and motor formed as a gear pump. The speed of the output of the transmission is typically controlled by varying the eccentricity of the pump track ring or swash plate.

In recent years, and particularly for smaller displacement applications, it has been common practice to integrate the hydrostatic transmission within the axle casing that also contains the differential and bearings for the two axles. Such casings are typically split along a horizontal plane containing the axis of the axles, and the casing itself is formed of only two parts. However, it is also known to utilize casings comprising three or more components wherein the casing components are attached to each other along vertical split lines or horizontal and vertical split lines.

Although utilizing a single casing for both the transmission and axle gear components necessitates only two large die castings, there are certain disadvantages inherent in such a design. One such disadvantage is that servicing of the hydrostatic transmission or the gear train/differential requires that the entire casing be opened, the oil drained and the complete mechanism withdrawn in order to perform such service. Furthermore, units wherein the hydrostatic transmission is sized for different displacements, for example, use with larger lawn and garden tractors, will require completely different transaxle casings. Since such casings are quite large and require expensive tooling to manufacture, this represents a significant additional cost. Furthermore, integrated hydrostatic transaxles are often noisy, especially when accelerating.

A typical construction of the hydrostatic transmission component of the transaxle includes a one-piece block common to both the pump and motor units, often referred to as a "center section." The center section facilitates an external mounting surface for a motor barrel and a pump barrel, and additionally, an internal valve body for providing hydraulic communication between the pump and motor barrels. Conventionally, the pump and motor barrel axes of rotation are 90 degrees to one another. Center section machining is difficult because the center section is substantial in size and machined surfaces are substantially perpendicular, often requiring multi-axis machining capabilities. This corresponds to a significant cost associated with this design type.

Moreover, many HSTs heretofore require that the pump and motor mechanism unit be matched to a fixed swash plate prior to mounting the mechanism into the casing. Typically, assembly requires positioning the fixed swash plate in the casing, mounting the pump and motor mechanism into the casing then taking measures to ensure the fixed swash plate is suitably aligned with the pump and motor mechanism. Arranging the fixed swash plate and pump and motor mechanism, in the manner described above, poses a significant step in the assembly process which represents additional cost.

SUMMARY OF THE INVENTION

The present invention is a modular transaxle providing an axle module including an axle casing, a differential and a reduction gear train connected to a differential. The differential and gear train are disposed in the axle casing and a pair of axles are connected to the differential and supported within the axle casing. A hydrostatic transmission module comprising a transmission casing separate from the axle casing hydraulically connects a pump and motor disposed in the transmission casing. An input drives the pump and the motor has an output connection to drivingly connected the reduction gear train to the motor. The hydrostatic transmission casing is removably connected to the axle mechanism casing. The motor output connection includes a shaft piloted to an input drive of the reduction gear train. The piloting of the shaft and input drive constitutes the alignment mechanism of the transmission and axle modules.

The present invention further provides a hydrostatic transmission including an axle module having a casing, a differential and a reduction gear train connected to the differential. The differential and gear train are provided in the axle casing and a pair of axles are connected to the differential and are supported within the casing. A hydrostatic transmission module comprises a casing separate from the axle module casing and includes a hydraulically connected pump and motor within the transmission casing. The pump has an input for driving the pump and the motor has an output connection attaching the reduction gear train to the motor. The hydrostatic transmission casing is connected to the axle casing and the motor output connection includes a shaft attaching to an input drive of the reduction gear train. The hydrostatic transmission module includes a pump and motor block rotatably supporting a pump cylinder barrel and a motor cylinder barrel. The pump and motor cylinder barrels are hydraulically connected through the pump and motor block and include axes of rotations substantially 90° offset. A portion of the pump and motor block forms an inclined surface which supports one face of a thrust bearing. The other face of the thrust bearing is engaged with a plurality of reciprocal pistons in the motor cylinder barrel.

In one form of the invention, the axle casing has two major casing halves joined together at an interface, the casing halves are substantially mirror images relative to one another about the interface.

A swash plate is positioned between the pistons and an interior portion of the transmission casing and preferably at least one homogeneous low friction bearing strip is confined between the swash plate and the interior portion of the casing.

A disconnect mechanism removably connects the axle module with the hydrostatic transmission and is disposed within the differential casing. The disconnect mechanism include a sleeve, a lever and a resilient member. The output shaft is selectively engaged with the input shaft through the sleeve and the resilient member urges the sleeve to engage the output and input shafts.

A brake shaft having an end disposed within the axle casing is meshingly coupled to the reduction gearing and preferably includes a pair of friction pads sandwiching a brake disc. The brake disc is disposed on the other end of the brake shaft and provided externally of the axle casing. A brake cover is fastened to the outer portion of the axle casing and substantially encloses the brake disc.

The present invention further provides a transaxle system and a method for manufacturing transaxles in either the left hand controlled or right hand controlled configurations using substantially identical axle modules. The transmission module used in the left hand controlled transaxle has the transmission module having the output shaft on the left and the control lever on the right when viewing the transmission casing with the pulley upwardly directed and toward the rear of the casing. On the other hand, the transmission module used in the right hand controlled transaxle has the transmission module having the output shaft on the right and the control lever on the left when viewing the transmission casing with the pulley upwardly directed and toward the rear of the casing. The use of either the left hand controlled or right hand controlled hydrostatic transmission modules allows either the left hand controlled hydrostatic transaxle or right hand hydrostatic transaxle configurations to be constructed using identically manufactured axle modules that are inverted for left or right hand drives.

The modular arrangement enables the hydrostatic transmission to be quickly removed and a replacement unit bolted in place if the hydrostatic transmission requires repair. The transmission can be sent back to the factory for rebuilding, and only minimal downtime to the consumer's lawn and garden vehicle will be experienced.

Another advantage to the modular approach is that a variety of hydrostatic transmissions and a variety of axle mechanisms can be mixed and matched to meet customers' application requirements.

A further advantage is that the use of a separate casing for enclosing the hydrostatic transmission enables the hydraulic components to be much more tightly held in place, thereby reducing noise, which is a problem with many integrated transaxles wherein the single casing encloses both the transmission and reduction gearing/differential mechanisms.

In the particular embodiment disclosed herein, the hydrostatic transmission employs an axial piston pump having a vertical input shaft, and an axial piston motor having a horizontal output shaft that extends out of the transmission casing and engages the reduction gear train of the axle mechanism through a mechanical disconnect device.

A further improvement in the transaxle of the present invention is the use of a brake cover, which may be made of molded plastic, in order to protect the brake disc from debris.

BRIEF DESCRIPTION OF THE DRAWINGS

The above-mentioned and other features and objects of this invention, and the manner of attaining them, will become more apparent and the invention itself will be better understood by reference to the following description of the embodiments of the invention taken in conjunction with the accompanying drawings, wherein:

FIG. 6 is a plan view of the center section for the hydrostatic transmission;

FIG. 7 is an elevational view of the center section;

FIG. 8 is a perspective view of the center section viewed from the bottom;

FIG. 9 is a perspective view of the center section viewed from the top;

FIG. 10 is a sectional view of the reduction gearing and differential module taken along a horizontal plane coincident with the axes of the axles and wherein the hydrostatic transmission module has been disconnected therefrom;

FIG. 11 is an elevational view partially in section showing a second, fender shift embodiment of the hydrostatic transmission;

FIG. 28 is an elevational view of the left hand controlled transaxle of FIG. 25 showing the transmission module removed; and FIG. 29 is an elevational view of the right hand controlled transaxle of FIG. 27 showing the transmission module removed.

DETAILED DESCRIPTION OF THE INVENTION

Figure 25:
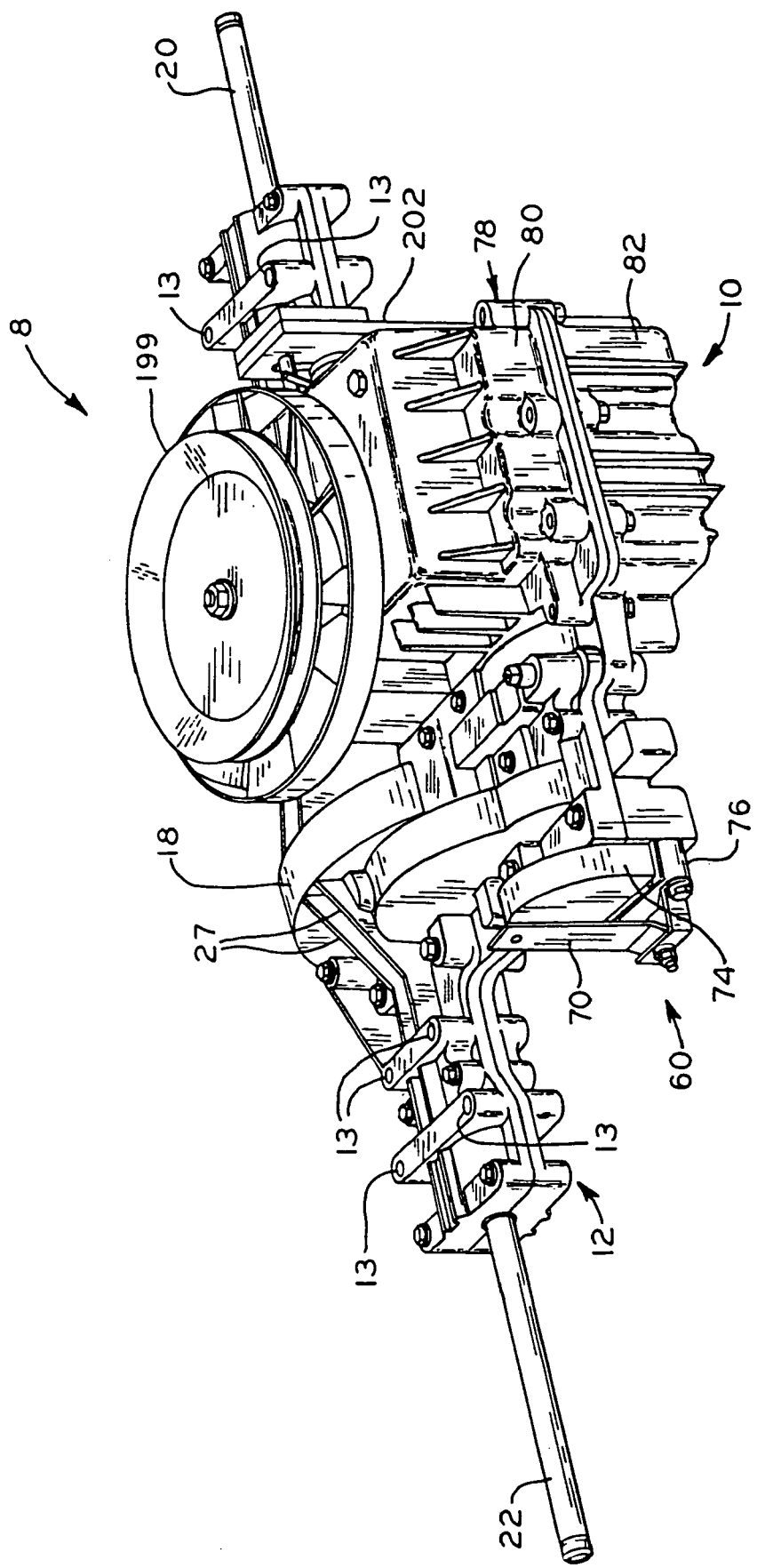
FIG. 25 is a perspective of the left hand controlled transaxle.

Referring to FIG. 25, there is shown left hand controlled hydrostatic transaxle 8 including hydrostatic transmission module 10 fastened to axle module 12. Hydrostatic transaxle 8 receives power from a power source (not shown), typically an internal combustion engine, and provides controllable power to axles 20 and 22 which drive wheels attached thereto (not shown). Axle module 12 is provided with a plurality of bolt holes 13 through its structure to secure the unit to the frame (not shown) of an agricultural vehicle or other like receiving structure utilizing transaxle 8. Power is transferred from the power source to transaxle 8 typically by a belt (not shown) engaged with pulley 199 attached to transaxle 8. External controls provided with transaxle 8 include brake lever 70 and control lever 202. Control lever 202 provides control of both speed and direction of the transaxle 8.

Figure 1:
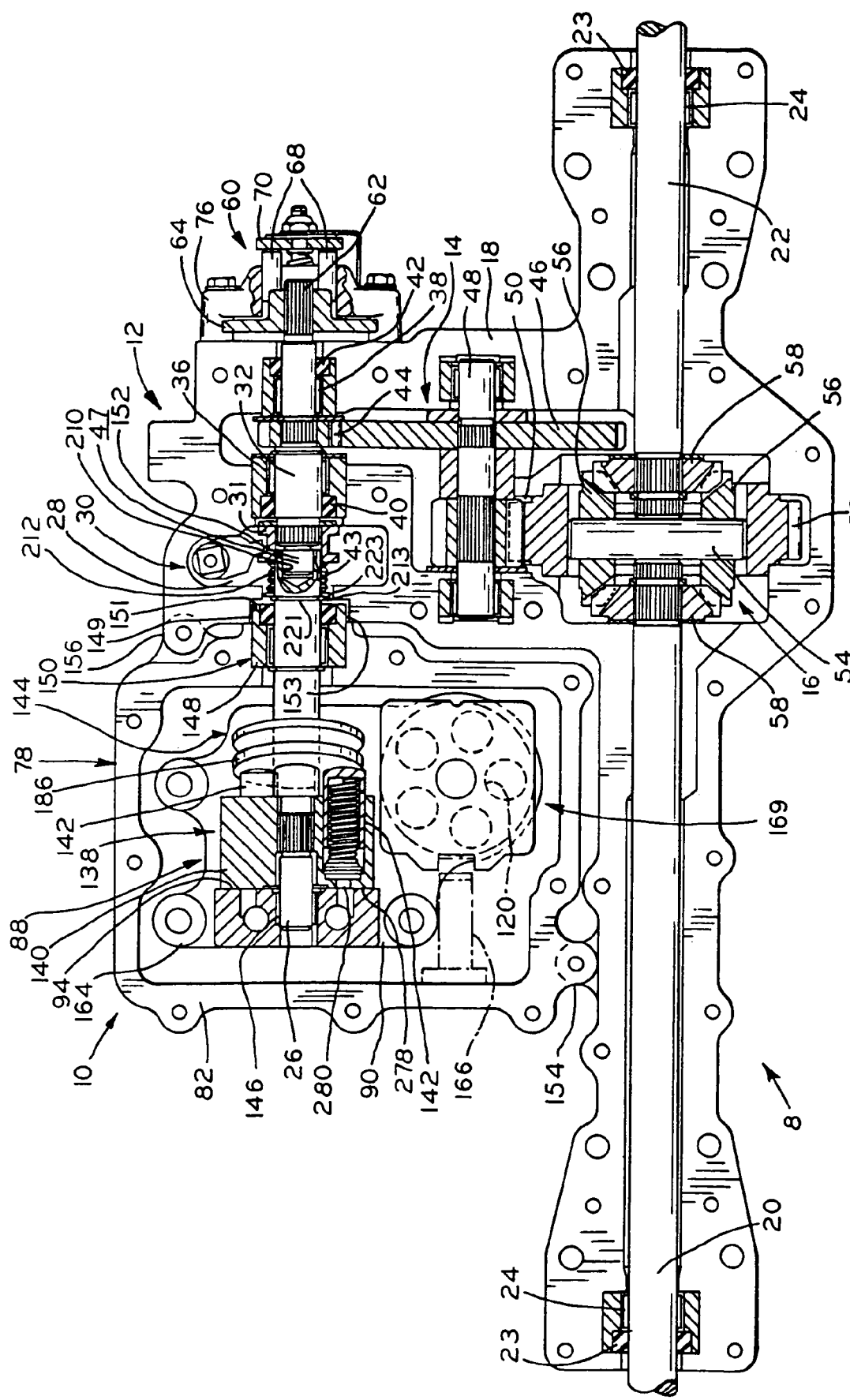
FIG. 1 is a sectional view of the left hand controlled transaxle of the present invention taken along a horizontal plane intersecting the axes of the axles.
Figure 13:
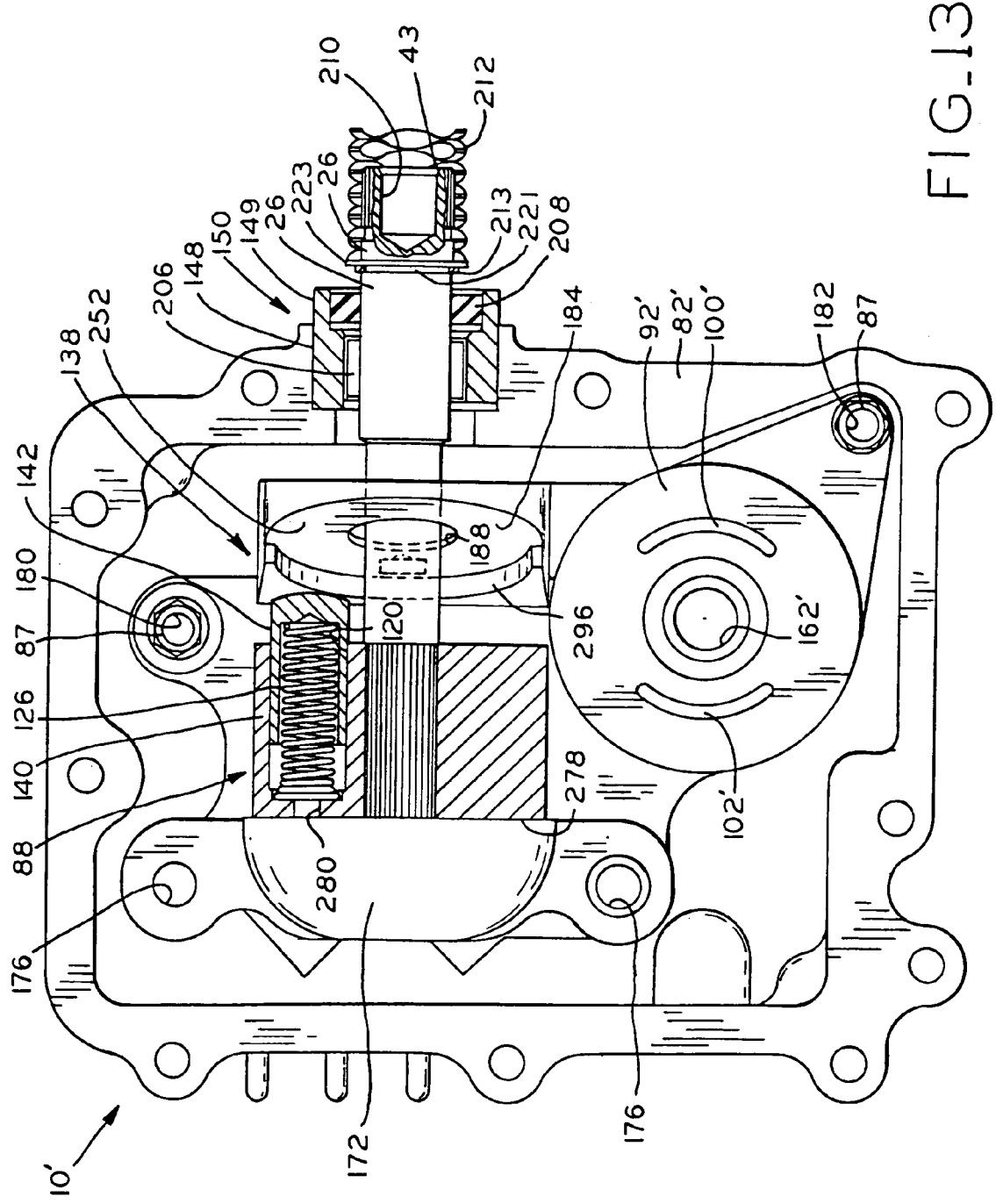
FIG. 13 is a sectional view taken along a horizontal plane of the second embodiment.
Figure 26:
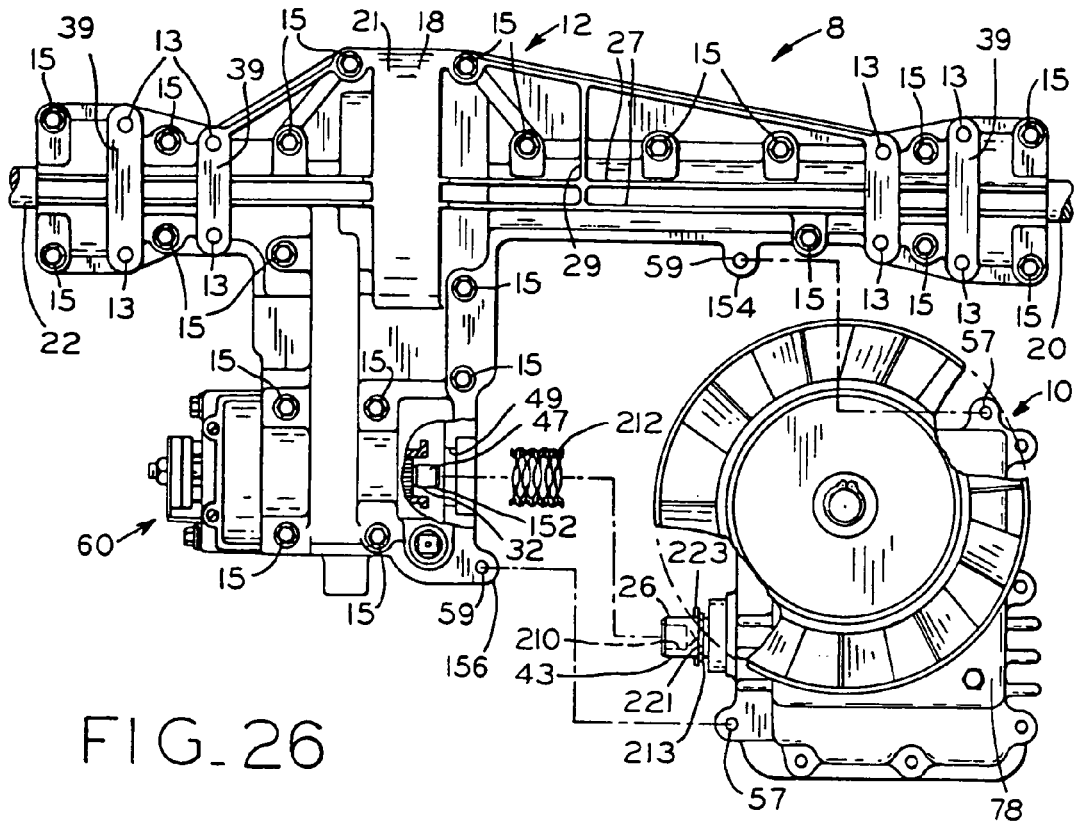
FIG. 26 is a top plan view of the transaxle of FIG. 25 partially broken away showing the hydrostatic transmission module removed from the axle module.

Referring to FIG. 26, the piloting and coupling structure which provides attachment between axle and hydrostatic transmission modules 12, 10 of left hand controlled transaxle 8 will be discussed. Hydrostatic transmission module 10 is drivingly coupled to axle module 12 through bore or inner surface 210 provided within end 43 of output shaft 26 which extends from transmission 10 and is coaxially engaged with outer surface 47 of end 152 of gear train input shaft 32. Input shaft end 152 is recessed within clearance hole 49 provided in axle casing 18. Shaft end 152 extends outwardly from and without any interference of casing 78 to provide uninterfered mating of shafts 26 and 32 and allows alignment of axle and transmission modules 12, 10 exclusively by engagement of shaft ends 43 and 152. Bolt receiving holes 57 provided in transmission casing 78 provide radial clearance for a pair of bolts (not shown) to extend through and engage with a pair of threaded holes 59 provided in mounting elements or bosses 154, 156 provided in axle casing 18. Thus, the bolts act to secure transmission module 10 to axle module 12 and do not assist in alignment. Note that output shaft 26, rotatably supported within transmission casing 78, includes radial 'play' relative to axle casing 18 to further facilitate proper engagement and non-binding operation between axle module 12 and hydrostatic transmission module 10. Sleeve 148 of sleeve and bearing assembly 150 is press fit into transmission casing 78 and includes an extended portion 149 external to casing 149 which extends into a circular recessed portion 151 (FIG. 10) of axle casing 18 (FIGS. 1 and 13). However, a clearance 153 (FIG. 1) exists between extended portion 149 of sleeve 148 and recessed portion 151 of axle casing 18 so alignment of axle module 12 and transmission module 10 is provided solely by shafts 26 and 32. The piloting and mounting of right hand controlled transmission module 11 to axle module 12 to form transaxle 9 (FIG. 27) is identical to the piloting and mounting of left hand controlled transmission 10 to axle module 12 to form transaxle 8 (FIG. 26).

Referring now to FIG. 1, left hand hydrostatic transaxle 8 comprises a hydrostatic transmission module 10 and an axle module 12, the latter including reduction gear train 14 and differential mechanism 16. Axle module 12 includes a casing 18 formed of upper and lower halves 21, 25 respectively, only upper casing half 21 is shown here, wherein casing halves 21, 25 are split along a horizontal plane or parting line 33 coincident with the axes of axles 20 and 22 (FIGS. 1, 28–29). Axles 20 and 22 extend outwardly from differential 16 through openings in the ends of casing 18, which are sealed by means of seals 23, and wherein axles 20 and 22 are supported by bearings 24.

The output shaft 26 from the motor 138 of hydrostatic transmission module 10 extends into a space 28 which carries a mechanical disconnect mechanism 30 of the type disclosed in U.S. Pat. No. 5,701,738 assigned to the assignee of the present application. This patent is expressly incorporated herein by reference. The disconnect mechanism 30 comprises a splined sleeve 31 that is moved axially by lever 19 (FIG. 10) to connect and disconnect shafts 26 and 32. Output shaft 26 is piloted around gear train input shaft 32 and shaft 32 is supported by bearings 36 and 38 (FIGS. 1 and 10). Shaft 32 is sealed by seals 40 and 42. Splined to shaft 32 is pinion gear 44, which is in intermeshing engagement with gear 46 splined to countershaft 48. Pinion 50, which is also splined to countershaft 48, engages ring gear 52 of differential 16. Differential 16 comprises pin 54 that carries bevel gears 56 and further comprises bevel gears 58 splined to axles 20 and 22. Reduction gear train 14 reduces the rotational speed of output shaft 32 and transmits the rotational motion to differential 16, which rotates axles 20 and 22 in a known manner. Axle casing 18 is filled with an appropriate lubricating oil or grease, and the entire casing is sealed from the ambient by seals 40, 42 and 23.

Figure 3:
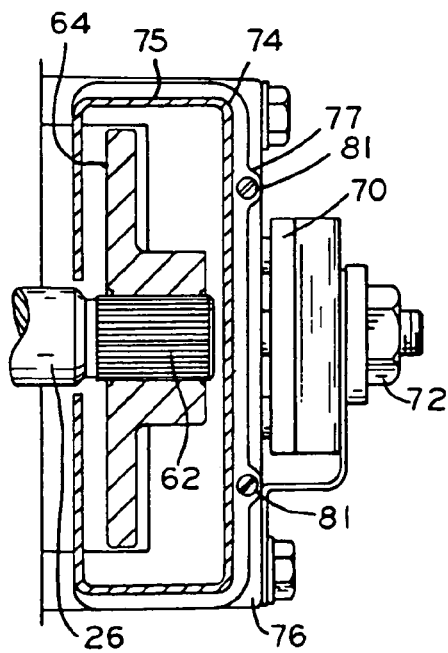
FIG. 3 is a top sectional view of the brake mechanism.
Figure 4:
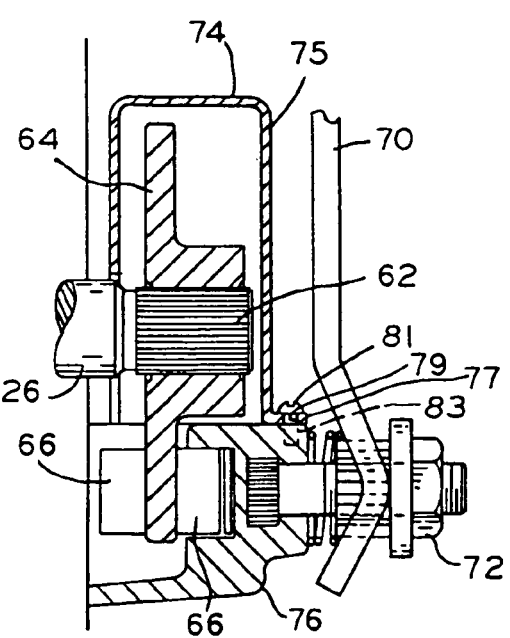
FIG. 4 is a vertical sectional view of the brake mechanism.

Referring now to FIGS. 1, 3 and 4, brake mechanism 60 will be described. The distal end 62 of shaft 32 is splined to disc 64 which is engaged by a pair of friction pads 66 (FIG. 4), wherein one of the friction pads 66 is pressed against disc 64 by a pair of pins 68 (FIG. 1) when brake lever 70 is rotated. A cast housing 76 supports the brake mechanism 60 and is mounted to axle casing by a pair of screws. Brake mechanism 60 employs a self-adjustment feature comprising a self-adjusting nut 72 that accommodates friction pad wear. The operation of the brake itself is well known and the self-adjustment mechanism is the subject of co-pending patent application Ser. No. 09/165,904, filed Oct. 2, 1998, and assigned to the assignee of the present application. This application is expressly incorporated herein by reference.

A further feature of brake mechanism 60 is the provision of a plastic injection molded cover 74 that attaches to the cast housing 76, and prevents grass clippings, dirt and other debris from fouling the brake mechanism (FIG. 25). Referring to FIGS. 3 and 4, brake cover 74 includes enclosure portion 75 and flange 77. A pair of apertures 79 are provided in flange 77 which receive a pair of screws 81 to fasten cover 74 to a pair of threaded holes 83 in cast housing 76.

Figure 2:
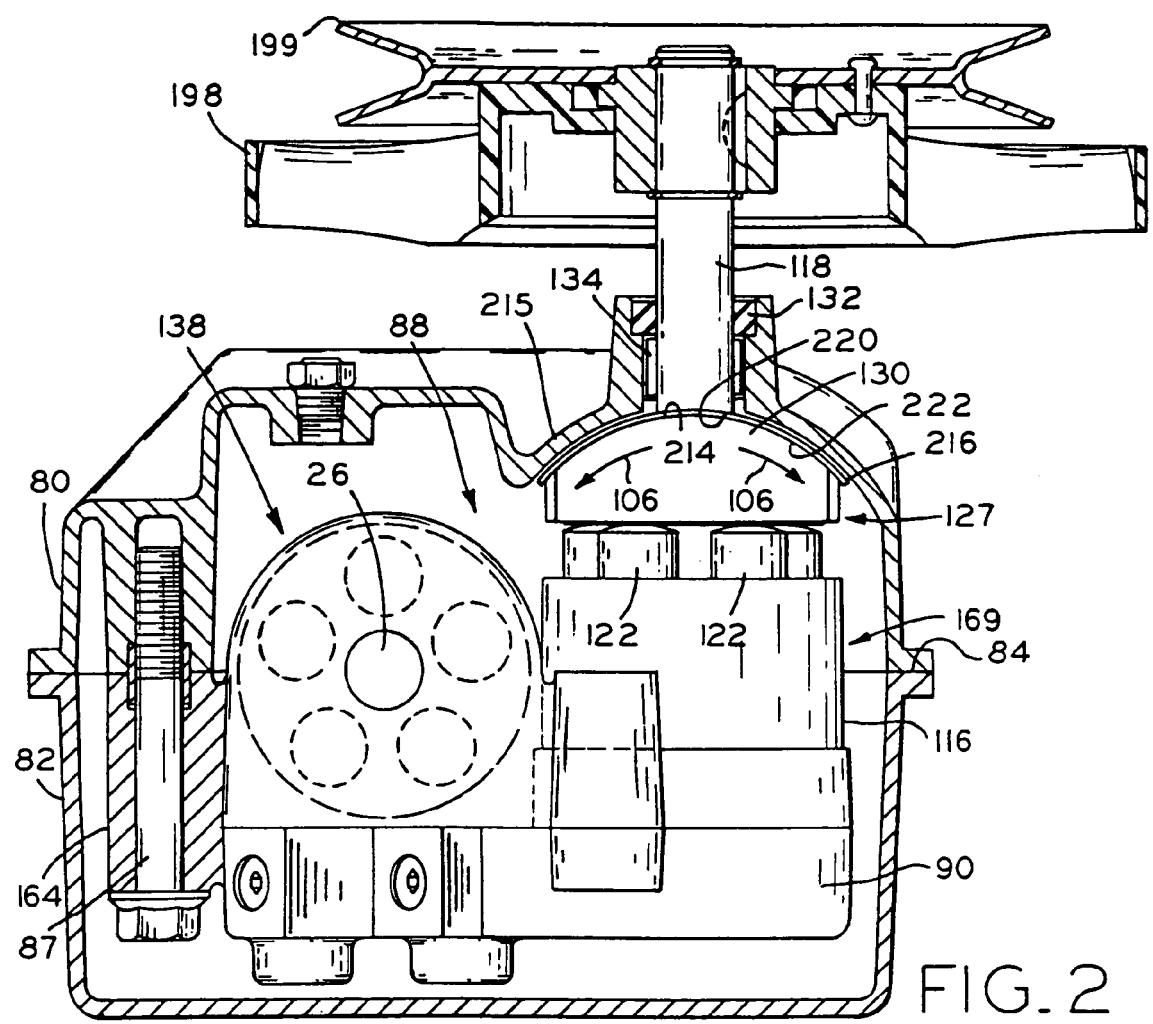
FIG. 2 is a sectional view of the left hand controlled hydrostatic transmission taken along a vertical plane.
Figure 5:
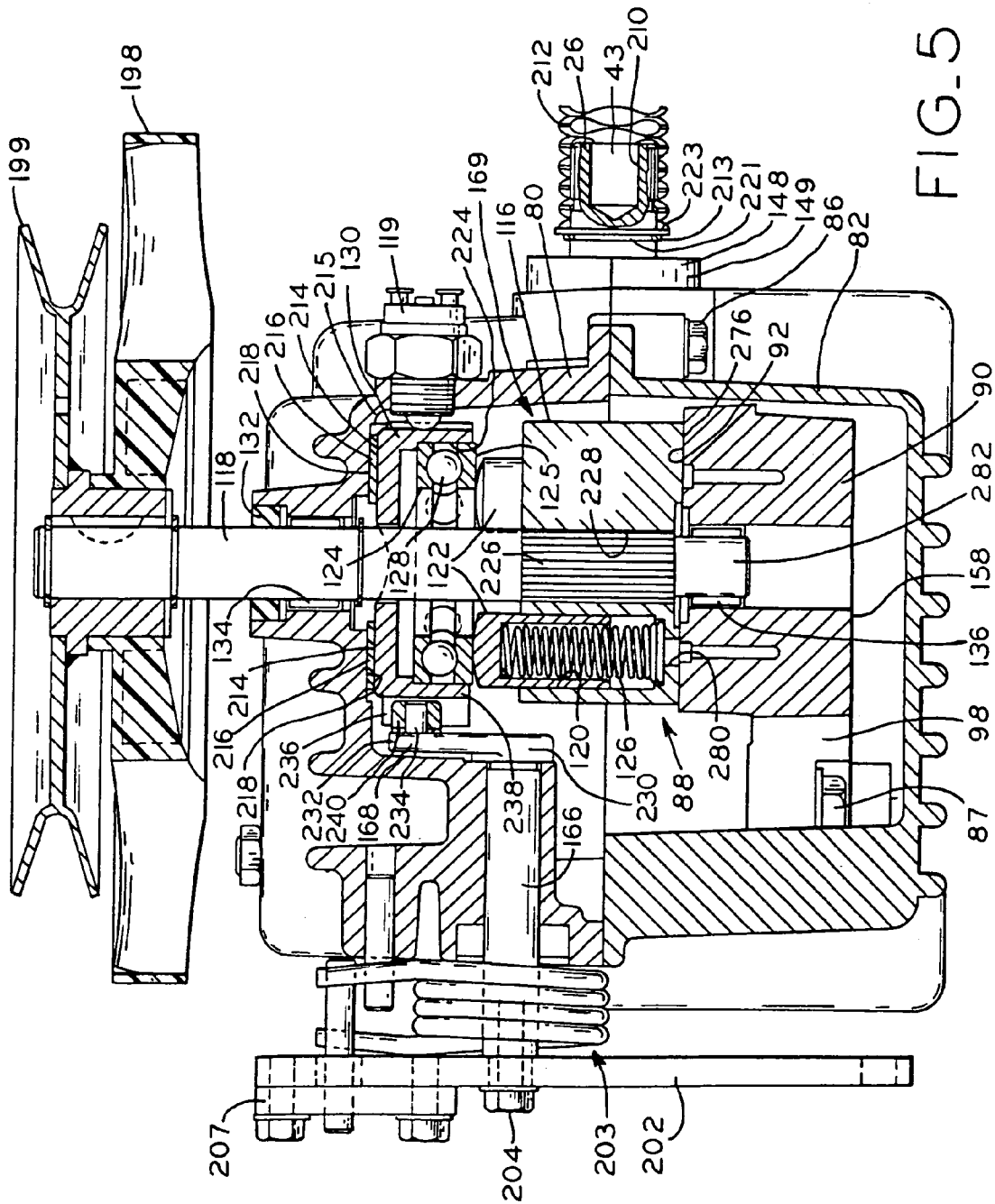
FIG. 5 is an enlarged sectional view of the hydrostatic transmission illustrating the pump.

Referring to FIGS. 2 and 5, hydrostatic transmission module 10 comprises a separate, self-contained casing 78 having two casing halves 80 and 82 split along a horizontal interface 84 that is coplanar with the axis of motor output shaft 26 (FIG. 1). Casing halves 80 and 82 are connected together by means of a plurality of screws 86 (FIG. 5) that extend through the lower casing half 82 and are threadedly received in bores in the upper casing half 80. Disposed within casing 78 is a hydrostatic pump and motor mechanism 88 comprising center section 90 having a pump mounting surface 92 (FIG. 5) and a motor mounting surface 94 (FIG. 9) and internal passages 96 and 98 (FIG. 6) hydraulically connecting arcuate slots 100 and 102 in pump face 92 with arcuate slots 112 and 114, respectively, in motor mounting face 94 (FIG. 9). As best seen in FIGS. 6 and 7, arrows 104 illustrate fluid circulation through center section 90. Note that fluid circulation may be reversed, relative to the direction indicated by direction 104, by rotating control arm 202 (FIG. 5) to tilt swash plate 130 (FIG. 2). Swash plate 130 includes a bidirectional range of tilt indicated by arrows 106 (FIG. 2).

Referring to FIG. 5, pump cylinder barrel 116, splined to input shaft 118 includes a plurality of chambers 120 in which are disposed pistons 122 urged against swash plate assembly 127 by means of springs 126. The swash plate assembly 127 includes a pair of races or grooved plates 124, 125 separated by a plurality of ball bearings 128 provided in a swash plate 130. Shaft 118 is sealed within upper casing half 80 by means of seal 132 and rotatably supported by bearings 134 and 136. Note that pump shaft 118 extends through swash plate assembly 127 and is splined to pump cylinder barrel 116. The distal end of shaft 118 is supported by bearing 136 in center section 90. Screws 87 connect center section 90 to upper casing half 80 (FIGS. 2 and 5).

Figure 27:
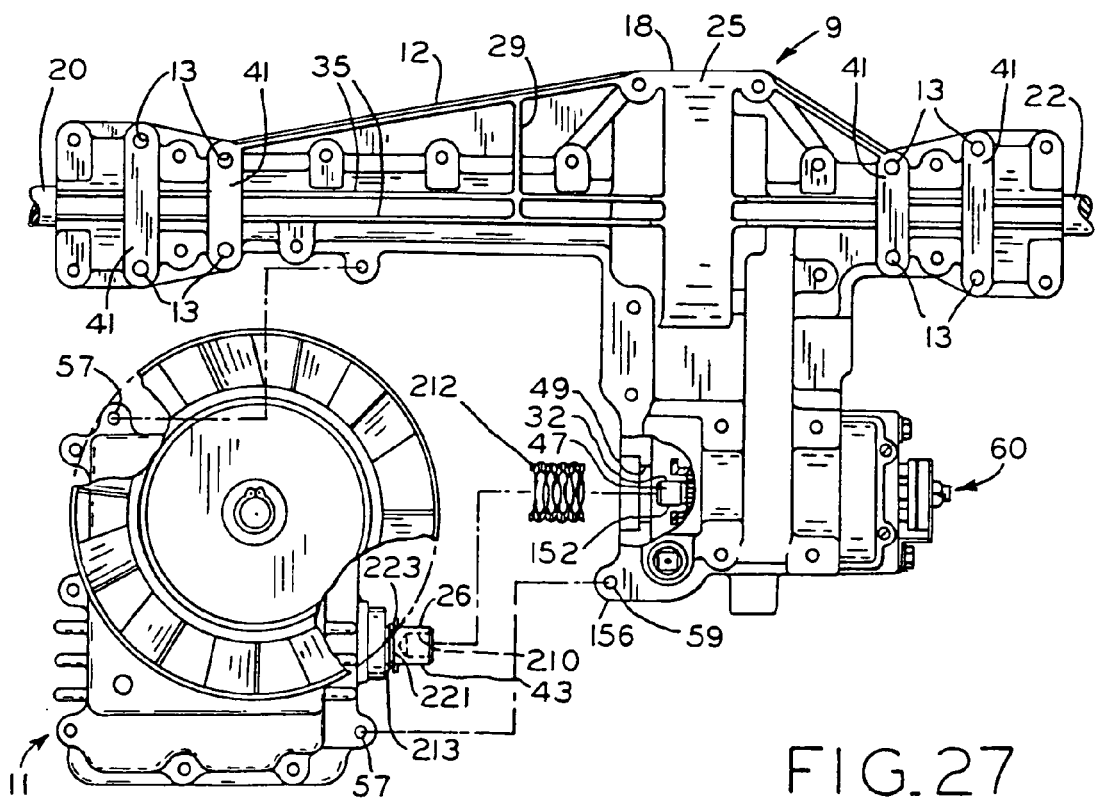
FIG. 27 is a top plan view of a right hand controlled transaxle partially broken away showing the hydrostatic transmission module removed from the axle module.

Referring now to FIGS. 1 and 2, axial piston motor 138 comprises a rotatable cylinder barrel 140 having a plurality of pistons 142 therein that rotate against fixed swash plate assembly 144, wherein cylinder barrel 140 is rotatably mounted on the face 94 (FIG. 9) of center section 90. Motor output shaft 26 extends through cylinder 140 and is supported by means of bearing 146 in center section 90 (FIG. 1). The axis of output shaft 26 is horizontal and oriented 90° relative to pump input shaft 118. Referring to FIGS. 1 and 13, motor output shaft 26 is supported by means of sleeve and bearing assembly 150 that is press fit into casing 78 and sleeve 148 of sleeve and bearing assembly 150 extends into recessed portion 151 in axle casing 18. Sleeve 148 includes an extended portion 149 which is superposed by recessed portion 151 of axle casing, however, extended portion 149 and recessed portion of casing 18 are separated by a clearance 153 such that output shaft 26 is at no time confined by axle casing 18. Piloting of transmission module 10 with gear train 14 is accomplished by means of surface 47 of a reduced end 152 of gearing input shaft 32 being received within an inner surface or bore 210 of an end 43 of motor output shaft 26 (FIGS. 1, 26–27). Because transmission casing 78 is not directly piloted to axle casing 18, binding of shafts 26 and 32 is avoided. Casing 78 is mounted to casing 18 at two locations 154 and 156 (FIGS. 1, 26–27) by means of overlapping extensions or bosses on casings 78 and 18 and bolts (not shown) that fasten from the bottom. These mounting points resist the rotational torque between transmission module 10 and gear mechanism 12.

Referring now to FIGS. 5–9, the lower surface 158 of center section 90 is provided with a pair of openings 160 to provide makeup oil to pump cylinder barrel 116, and a filter (not shown) and check valves (not shown) will be provided as is customary. Pump shaft 118 provided with bearing 136 (FIG. 5) is received within bore 162. Integral bosses 164 of center section 90 accommodate and provide support for the mounting screws 87. Blind drilled passageways will be sealed by plugs 270 as is customary in the art. Center section 90 includes an extended portion or bearing cradle 184 to support bearing assembly or thrust bearing 186 (FIG. 1) therein. Bearing cradle 184 includes a clearance hole 188 to allow motor shaft 26 to extend through and spline to motor cylinder barrel 140 (FIG. 1).

As shown in FIG. 2, pump swash plate assembly 127 will be tilted through the range 106 provided by the action of control rod 166 and control arm 168 (FIG. 5) in order to vary the displacement of pump 169.

FIG. 10 is a further view of the gear train 14 and differential mechanism 16 wherein hydrostatic transmission module 10 has been disconnected therefrom. Shown more clearly is the reduced end 152 of input shaft 32 on which output shaft 26 of transmission module 10 is piloted. As described previously, because both transmission module 10 and axle module 12 are modular, axle module 12 can be reversed in order to provide right hand or left hand connections to brake 60 and the input shaft 118 of transmission module 10. For example, to provide a connection which is reversed to that shown in FIG. 1, one would invert axle module 12 about a horizontal axis perpendicular to axles 20 and 22 and mount a modified right hand (or left hand) mirror image transmission module 9 (FIG. 27) thereto in the same fashion as shown in FIG. 1 but on the opposite side of the gear reduction drive train portion of axle module 12. This enables right hand and left hand drives to be provided to a customer base with the need to stock only two hydrostatic transmission modules 9, 10 and a single axle module 12.

Figure 14:
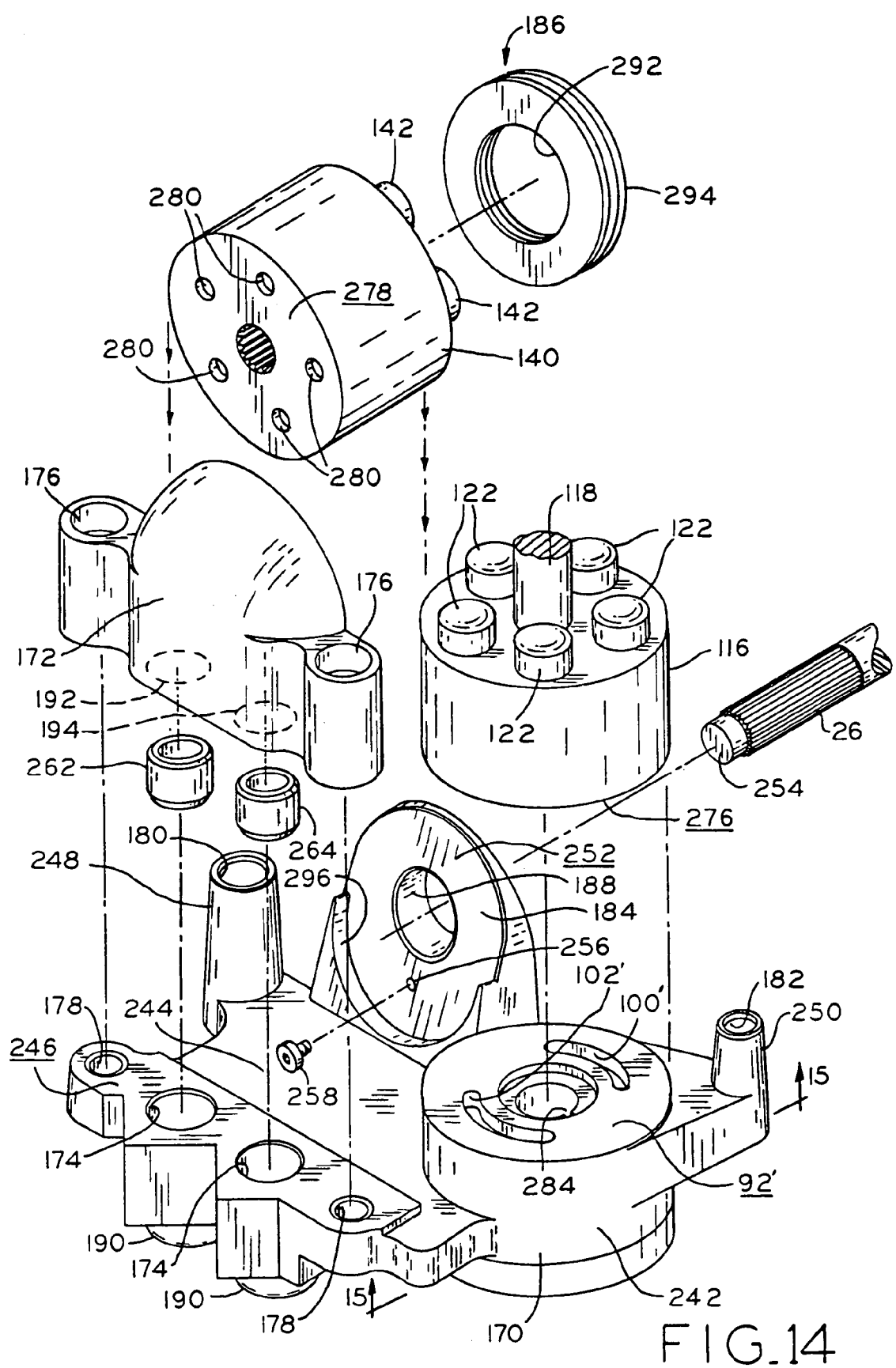
FIG. 14 is an exploded view of the pump and motor assembly of the second embodiment of the hydrostatic transmission.
Figure 15:
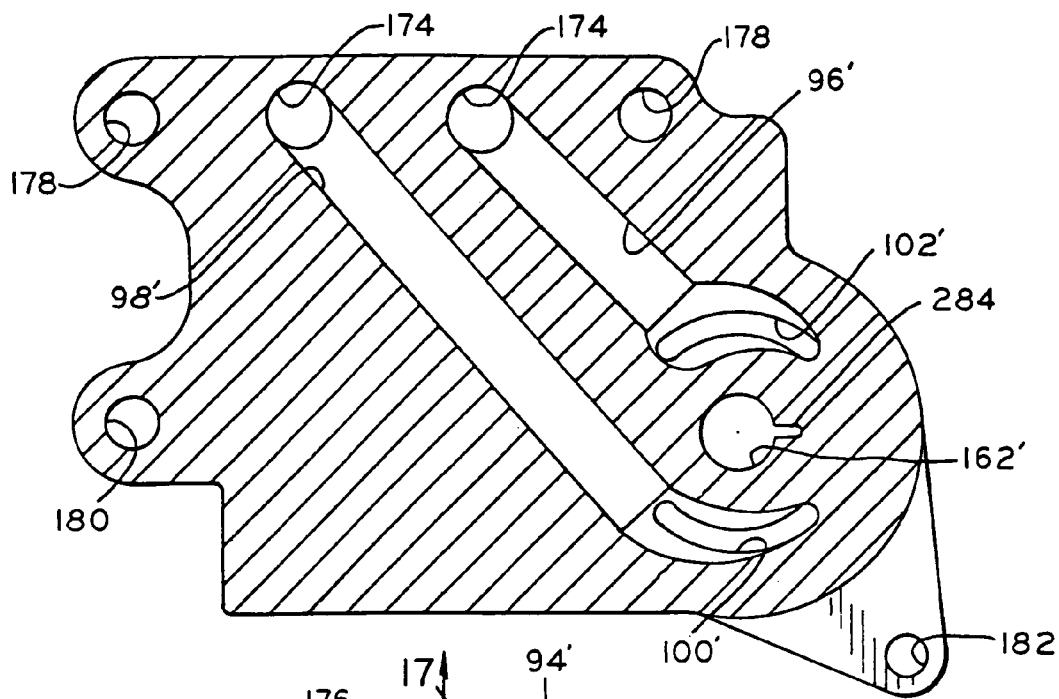
FIG. 15 is a sectional view taken along line 15—15 of FIG. 14 and viewed in the direction of the arrows.

FIGS. 11–18 illustrate a modified embodiment of transmission module 10 wherein certain corresponding elements are denoted by primed reference numerals. In this embodiment, one-piece center section 90 is not used. In its place is pump and motor mechanism 88' including pump valve body or pump block 170 and motor block 172 (FIG. 14). Pump and motor mechanism 88' provides the valving for motor cylinder barrel 140 to hydraulically connect with pump cylinder barrel through transfer passages 96' and 98'. Motor block 172 is fastened to pump block 170 to form pump and motor block 173. Motor block 172 is fastened to pump block 170 by means of screws 87 that extend through bores 176 in motor block 172 and holes 178 in pump block 170 (FIGS. 2, 14, 16 and 18). Pump block 170 and motor block 172 are mounted to upper casing half 80' by means of fastening screws 87 (FIGS. 2, 5 and 12) that pass through openings 180 and 182 (FIGS. 13–15).

Pump block 170 includes a fixed swash plate support face or bearing cradle 184 (FIGS. 13, 14, 23 and 24) that is disposed at a fixed angle α (FIG. 23) relative to the horizontal plane Y and carries ball bearing assembly or thrust bearing 186 (FIGS. 14, 23 and 24) against which motor pistons 142 rotate thereby causing motor cylinder barrel 140 to rotate and drive output shaft 26. Opening on clearance hole 188 passing through bearing cradle 184 provides clearance for output shaft 26. Makeup oil to hydrostatic transmission module 10' is provided through ports 160 having check valves, similar to ports and check valves in center section 90, as shown in FIG. 8.

Motor block 172 is provided with a pair of ports 192 and 194 that align with ports 174 in pump block 170 in order to provide hydraulic communication between the arcuate slots 112' and 114' in the face 94' of motor block 172 through transfer passages 96' and 98' to the arcuate slots 102' and 100' in the face 92' against which pump cylinder barrel 116 (FIG. 12) rotates. Motor block 172 includes bore 196 which supports rotatable end 254 of output shaft 26. Alternatively, end 254 of output shaft 26 includes a bearing fitted thereon which fits into bore 196 to suitably support rotatable shaft end 254.

Figure 12:
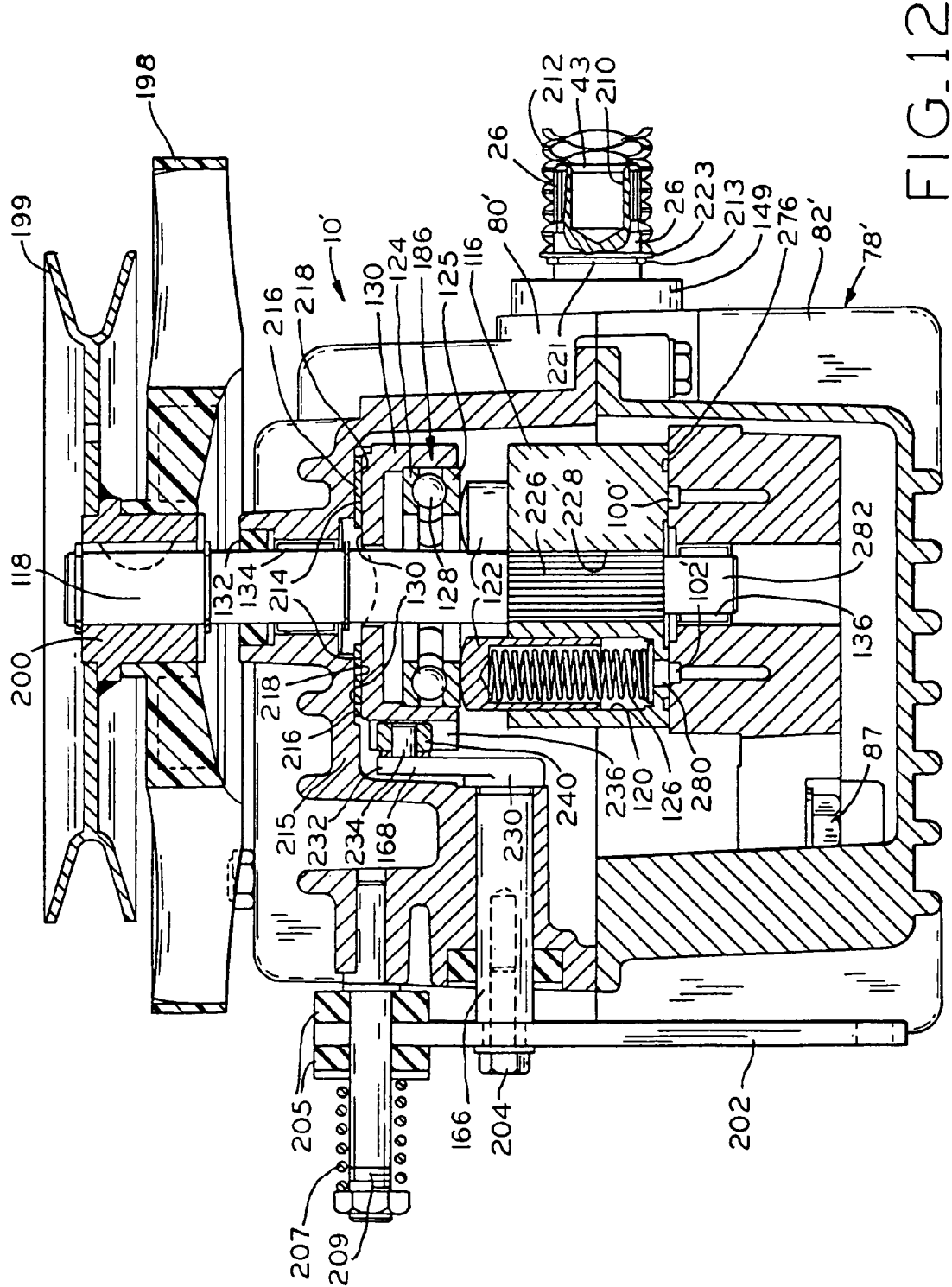
FIG. 12 is a sectional view of the fender shift embodiment.

Referring now to FIG. 12, it will be seen that pump input shaft 118 is driven by means of a pulley 199 driven by a belt connected to a similar pulley (not shown) on the output shaft of an internal combustion engine (not shown), for example. Pulley 199 forms an assembly with fan 198 supported on a common hub 200 that is keyed to shaft 118. FIGS. 11 and 12 illustrate a fender shift version of the unit wherein control arm 168 is rotated by shaft 166, the latter rotated by means of shift lever 202 fastened to shaft 166 by screw 204. A friction pack comprising a pair of friction pucks 205 grip shift lever 202 to retain lever 202 in the position set by the operator. Clamping force on friction pucks 205 is accomplished by means of a spring 207 disposed on stud 209, the latter being slidably received in upper casing half 80'. In a foot pedal version (FIG. 5) the corresponding shift lever 202 is returned to neutral by means of a conventional return-to-neutral spring mechanism 203. On the foot pedal version shown in FIG. 5, adjustable plate 207 permits fine adjustment of neutral position.

FIG. 13 illustrates motor 138' in greater detail and it will be seen that output shaft 26 is supported by bearing 206 and is sealed against casing 80', 82' by sleeve 148 of sleeve and bearing assembly 150 and oil seal 208. The bore 210 in the end of shaft 26 pilots around end 152 of input shaft 32 of axle module 12 (FIG. 10), and axial compression spring 212 maintains splined sleeve 31 of the mechanical disconnect mechanism (FIG. 10) engaged with the splined portion 211 of shaft 32 when motor output shaft 26 is inserted into axle module 12. Axial compression spring 212 is coaxially arranged about output shaft 26 (FIGS. 1, 5, 12, 13, 26 and 27) and confined between splined sleeve 31 and retaining ring 213 (FIG. 1). Retaining ring 213 is engaged or 'snapped' in groove 221 formed in output shaft 26 as is customary. A flat washer 223 may be provided between retaining ring and compression spring 212 to provide further support for compression spring 212. In operation, as disconnect lever 19 is rotated clockwise as viewed in FIG. 10, sleeve 31 is moved axially to the left against the pressure of spring 212. This very simple mechanism eliminates the need for an external spring or torsion spring on other elements typical of external disconnect mechanisms. Preferably, spring 212 is a Smalley flat wire metal spring. Output shaft 26 is rotated by cylinder barrel 140 of motor 138 and extends through clearance opening 188 in bearing cradle 184.

Figure 19:
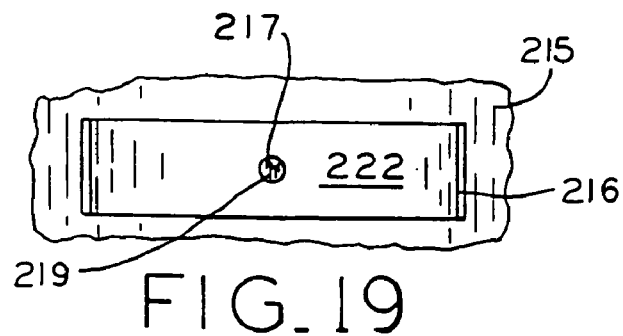
FIG. 19 is a bottom view of the upper half casing of the hydrostatic transmission broken away showing one of the bearing strips.
Figure 20:
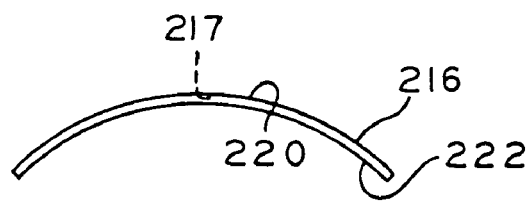
FIG. 20 is an end elevation of one of the bearing strips.
Figure 21:
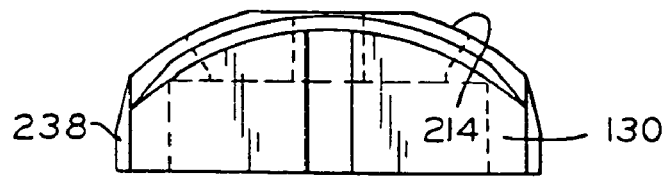
FIG. 21 is an end view of the swash block.
Figure 22:
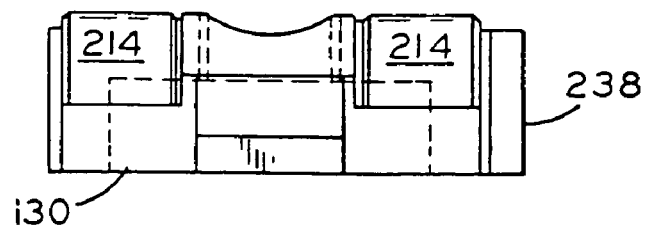
FIG. 22 is a front elevation of the swash block.

As shown in FIGS. 2, 5 and 12, swash plate 130 includes a pair of arcuate upper surfaces 214 (FIGS. 21 and 22) that bear against a pair of arcuate bearing strips 216 (FIGS. 19 and 20) that are fastened into recessed area 215 of upper casing half (80, 80'). Bearing strips 216 are made of TEFLON impregnated DELRIN and swash plate 130 is preferably made of carbon steel by means of a powder metal process. Specifically, bearing strips 216 may be manufactured by, for example, a plastic injection molding process comprising a homogeneous composition of DELRIN and about 20% PTFE. Openings 217 (FIGS. 19 and 20) in each of the bearing strips 216 are engaged by a cast protrusion 219 on the internal wall 215 of upper casing 80, 80' (FIG. 19). Concave recessed area 215 of upper casing half 80, 80' defines a pair of concave surfaces 218 each of which contact a convex outer surface 220 (FIGS. 2 and 20) of each bearing strip 216. Each bearing strip 216 includes a concave inner surface 222 (FIGS. 2, 19 and 20) in contact with each respective arcuate upper surface 214 of swash plate 130. Referring to FIGS. 5 and 12, a compression force created by springs 126 urging pump pistons 122 against swash plate assembly 127, presses swash plate 130 against bearing strips 216 to correspondingly hold each bearing strip 216 against surface 218 of casing (80, 80'). Each cast protrusion 219 is integrally formed within upper half casing 80, 80' and projects from surface 218. Each projection extends into opening 217 of each bearing strip 216 to prevent movement of bearing strips 216 during tilting of swash plate 130. Referring to FIGS. 2, 5, 11 and 12, displacement of lever 202 urges swash plate 130 to swing in an arc defined by the curvature of convex surfaces 218 within upper casing half (80, 80'). Bearing strips 216 are flexible and thereby partially deform to the curvature of upper half casing surfaces 218, and additionally to arcuate swash plate surfaces 214. Since bearing strips 216 deform to abutting surfaces, minimal if any machining of these surfaces is required. Because bearing strips comprise a homogeneous material rather than merely a coating on a metal strip, they will exhibit better wear and a longer life.

Referring to FIG. 12, shown is hydrostatic transmission module 10 of transaxle 8, including pump and motor mechanism 88' comprising pump 169', motor 138', and pump and motor block assembly 173 (FIG. 3). Pump and motor block assembly 173 includes a two piece structure wherein pump block 170 is joined with motor block 172 to provide a single integrated unit (FIG. 14). Rotatably supported by pump and motor block assembly 173 is pump cylinder barrel 116 and motor cylinder barrel 140 (FIG. 3). Pump cylinder barrel 116 includes a plurality of axially arranged chambers 120 having pistons 122 disposed in each chamber 120. Typically, pump cylinder barrel 116 and pistons 122 are common and interchangeable with motor cylinder barrel 140 and pistons 142 to decrease costs associated with implementing separate components. Springs 126 are provided within each chamber 120 and contact pistons 122 to urge pistons 122 toward and against swash plate assembly 127. Thrust bearing 186 is coaxial relative to pump cylinder barrel 116, and in contact with outermost extents of pistons 122. Thrust bearing 186 fits snugly within swash block or swash plate 130, specifically plate 124 of thrust bearing 186 engages bore 224 (FIGS. 5 and 12) of swash plate 130. A counterbore (not shown), is coaxial with bore 224 and is positioned adjacent plate 125 of thrust bearing 186 to provide rotational clearance for plate 125 of thrust bearing 186 to rotate freely within swash plate 130.

Operation of hydrostatic pump and motor mechanism 88', through movement of swash plate 130 to effectuate variable rotational movement of the motor cylinder barrel 140, will now be described. Customarily, pump cylinder barrel 116 is driven by the power source through input shaft 118. Typically, input shaft 118 includes a first end attached to pulley 199 and pulley 199 is belt driven by the power source (not shown). The other end of input shaft 118 includes a splined portion 226 disposed on the surface of input shaft 118 and engages matching splined portion 228 formed within pump cylinder barrel 116. Swash plate 130, selectively controlled by shift lever 202, which is external to the hydrostatic transmission casing, initiates fluid displacement within pump cylinder barrel 116 to transfer power from input shaft 118 to drive axles 20, 22. Neutral switch 119 is provided on an external surface of transmission casing 78 and extends through the casing to register off of a periphery of the swash plate 130 (FIG. 5). Neutral switch 119 is in electrical communication with a vehicle's ignition switch (not shown) to prevent vehicle start-up when the hydrostatic transmission is engaged. Shift lever 202 is attached to rotatable control arm 168 by screw 204, external of casing (78, 78'). Control arm 166 includes first end 230 attached to control rod 166 and a second end 232 extending outwardly and generally perpendicular from control rod 166. Second end 232 of control arm 166 swings through an arc respective of control rod 166 when control rod 166 is rotated. Pin 234 attaches to second end 232 of control arm 166 and extends into slot 236 disposed on periphery 238 (FIGS. 21 and 22) of swash plate 130. Friction roller 240 fits over pin 234 and freely rotates about pin 234 to engage with slot 236 of swash plate 130. Selectively positioning control lever 202, typically by an operator depressing a foot pedal linked thereto through linkage means, causes swash plate 130 to tilt, and in turn, pistons 122, orbiting about input shaft 118, reciprocate causing fluid in each cylinder 120 to pressurize as the respective piston retracts. Swash plate 130 tilts and rotates against a pair of low friction bearings attached to the casing as previously described.

Figure 23:
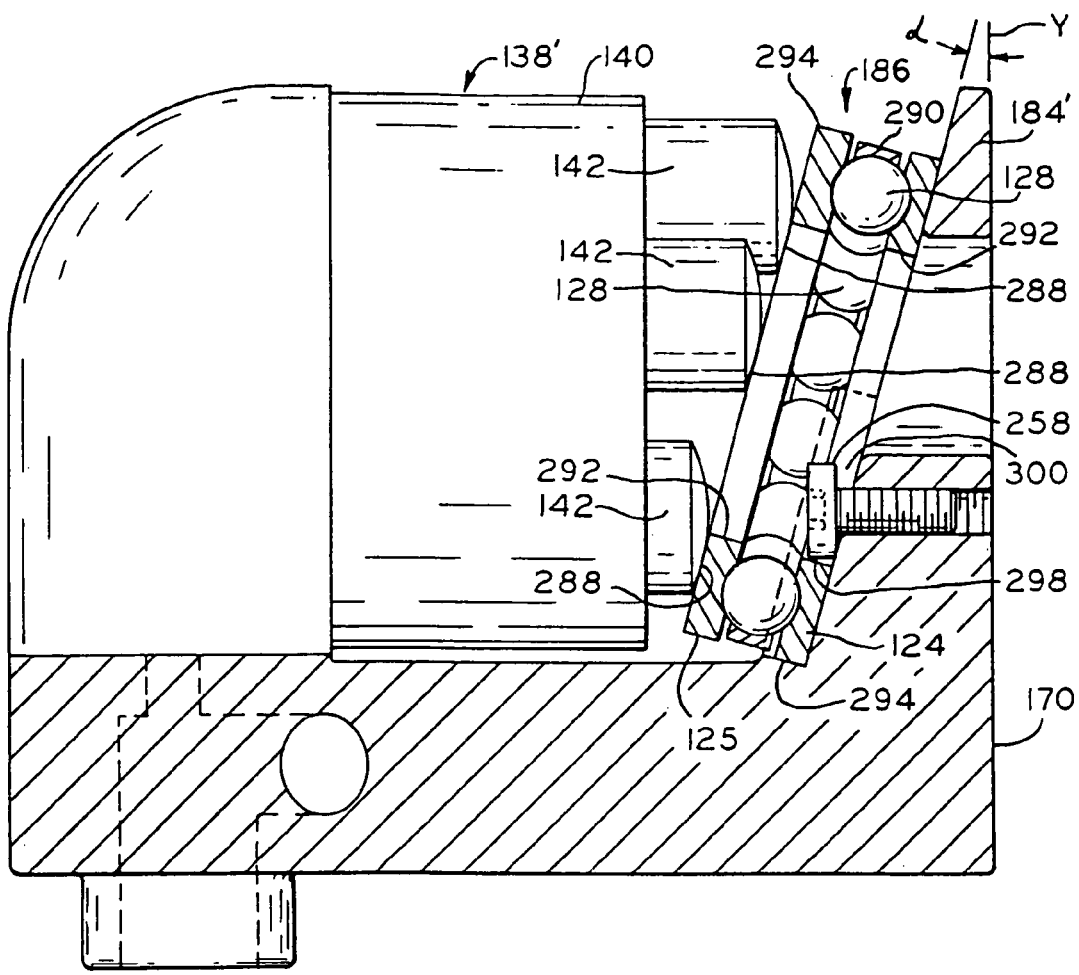
FIG. 23 is a sectional view of the pump block and thrust bearing taken along a vertical plane showing retainment of the thrust bearing.

Referring to FIG. 14, pump and motor block assembly 173 includes pump block 170 and motor block 172 joined together by screws 87. Pump block 170 includes cylindrical portion 242 joining rectangular body portion 244. Raised circular face 92' is disposed on cylindrical portion 242 and constitutes a mounting surface for pump cylinder barrel 116. Rectangular body portion 244 of pump block 170 includes a raised rectangular motor block mounting surface 246 which provides a surface to attach motor block 172. A pair of annular column portions or bosses 248, 250 are joined to pump block 170 and each include fasteners 87 extending through to fasten the pump and motor block assembly 173 to upper casing half 80' (FIGS. 12 and 13). A projecting semi-circular bearing cradle 184, to provide a seat for fixed thrust bearing 186, is integral with body portion 244 of pump block 170. Bearing cradle 184 includes an annular face 252 which is substantially smooth and flat in the "as-cast" condition, thus this surface requires little if any machining. The pump block 170 may be constructed of an aluminum alloy and fabricated by, for example, a foam insert casting process. Annular face 252 is inclined at angle α, respective of vertical reference plane Y (FIG. 11), to suitably cause motor pistons 142 to reciprocate, within chambers 120. Preferably, α is 15°. Clearance hole or opening 188 is generally centered in face 252 of bearing cradle 184 and end 254 of output shaft 26 extends through clearance hole 188 and attaches to motor cylinder barrel 140 (FIG. 14). Hole 256 is threaded and disposed in a lower portion of inclined face 252 to receive stop member 258 which constitutes, for example, a screw to retain thrust bearing 186 as shown in FIG. 23.

Motor block 172 includes mounting surface 260 (FIGS. 17 and 18) which overlays block mounting surface 246 of rectangular portion 244 of pump block 170. Referring to FIGS. 6–9, motor block 172 includes a pair of circular fluid ports 192, 194 positioned between a pair of outer fastener clearance holes 176, which respectively align with and overlay respectively, the pair of circular fluid ports 174 and the pair of outer holes 178 within pump block 170 (FIG. 14). Screws 87 extend through respective clearance holes 176 within motor block 172 and into respective holes 178 within pump block 170. Motor block 172 includes raised circular mounting face 94', which is substantially perpendicular to block mounting surface 260, to which motor cylinder barrel 140 is rotatingly mounted. As best seen in FIG. 14, a pair of inserts 262, 264 made of powered metal are interference fit around screws 87 and between pump and motor blocks 170, 172 to suitably seal and align fluid ports 192, 194 of pump block 170 with fluid ports 174 of motor block 172.

Figure 24:
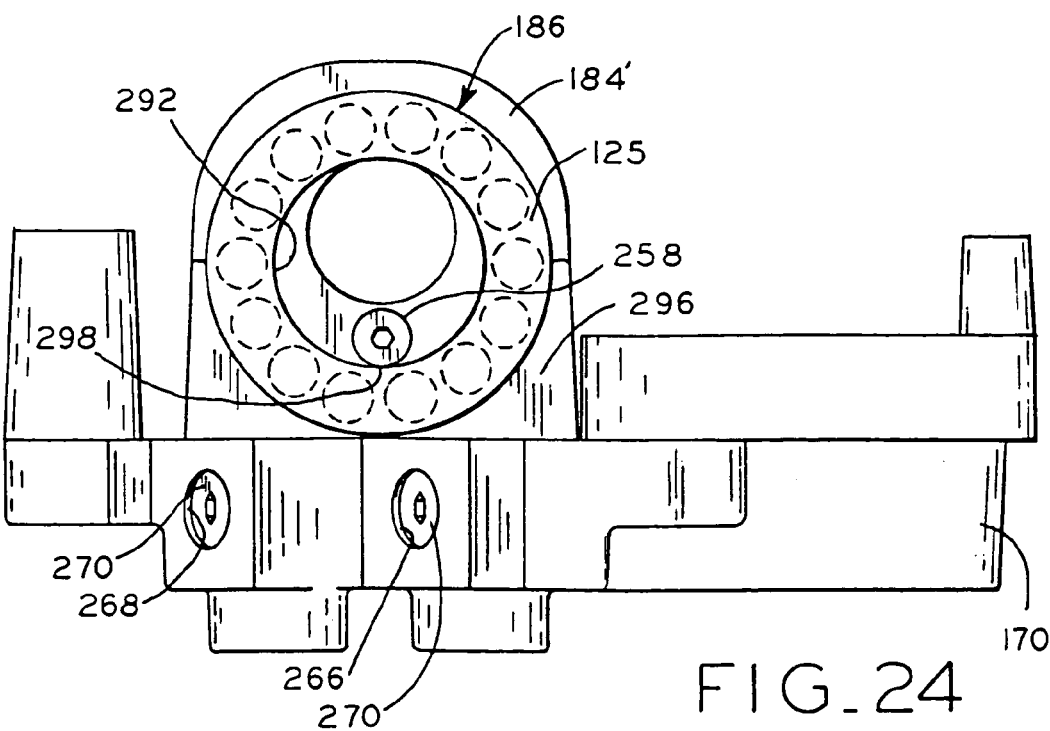
FIG. 24 is an elevated front view of the pump block and thrust bearing assembly of FIG. 23.

Referring to FIG. 15, the pair of hydraulic passages internal to pump block 170 will be described. Pump block 170 includes arcuate openings 100', 102' in face 92' which extend within an interior of cylindrical portion 242 of pump block 170 and respectively intercept the transfer passages 96', 98' disposed within rectangular portion 244 of pump block 170. Passages 96', 98' may include as-cast arcuate walls defining the passageways extending from pump mount face 92' to respective fluid ports 174, by being formed through, for example, a foam insert casting process. Alternatively, passages 96', 98' may be machined to include entrance holes 266, 268 respectively capped by threaded plugs 270 (FIG. 24).

Figure 16:
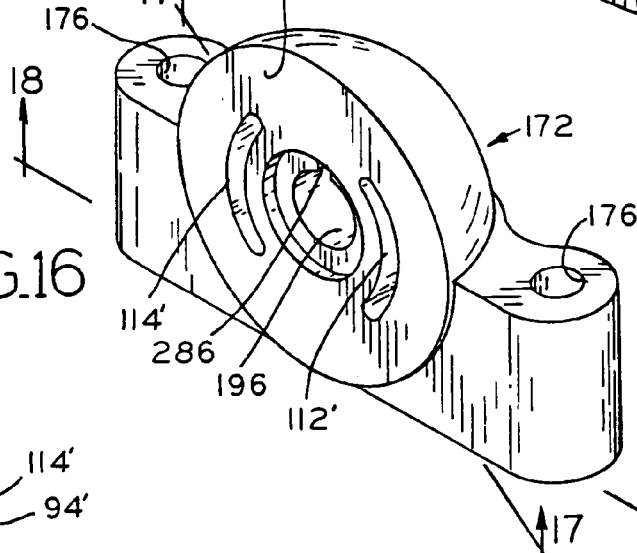
FIG. 16 is a perspective view of the motor block for the second embodiment.
Figure 17:
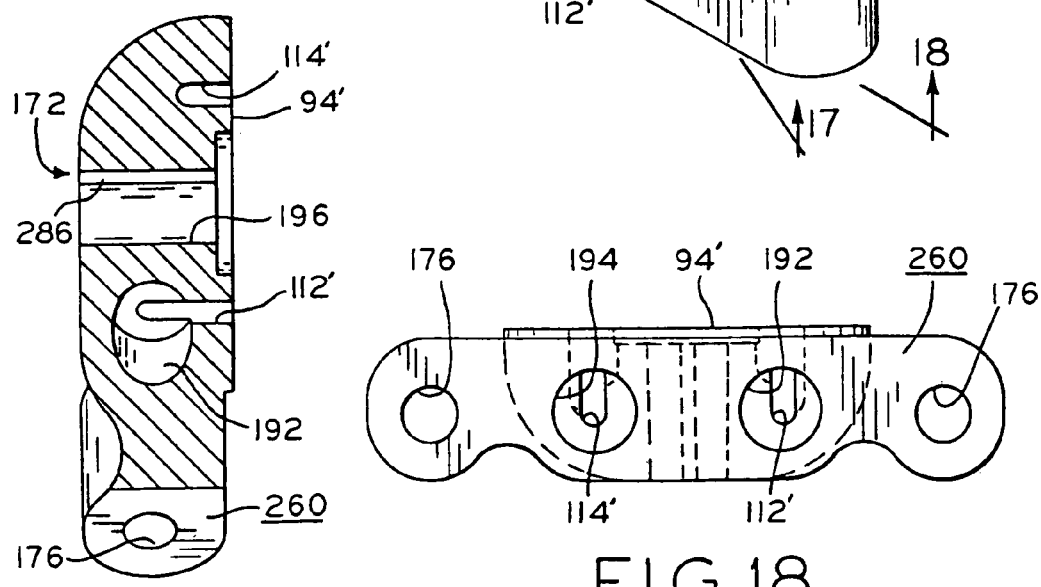
FIG. 17 is a sectional view of FIG. 16 taken along line 17—17 and viewed in the direction of the arrows.
Figure 18:
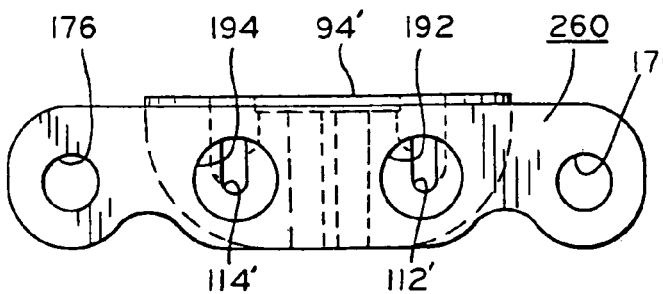
FIG. 18 is a bottom view of the motor block.

Referring to FIGS. 16–18, the hydraulic passages within motor block 172 will be described. Motor block 172 includes arcuate slots 112', 114' provided in face 94 which extend inwardly and intersect ports 192, 194. Referring to FIGS. 16 and 17, motor mount face 94' also includes centered bore 196 extending substantially perpendicular to face 94' and which provides support for rotating output shaft 26 extending through motor cylinder barrel 140 to align motor cylinder barrel 140 on face 94'. Motor block 172 may be formed by, for example, a powder metal process, which provides suitable smooth and continuous walls defining continuous arcuate slots 112', 114' intersecting ports 192, 194. Thus, motor block 172, joined to pump block 170 comprising pump and motor block assembly 173, provides two complete and continuous passages extending from pump mount face 92' to motor mount face 94.

Referring to FIG. 14, typically, pump cylinder barrel 116 is driven by input shaft 118 and face 276 of pump cylinder barrel 116 abuts face 92' of pump block 170. Similarly arranged is face of motor cylinder barrel 140 against face 94 of motor cylinder block 172. Face 276 of pump cylinder barrel 116 includes a plurality of axial arranged ports 280 (FIGS. 5 and 12) through which hydraulic fluid communicates from piston chamber 120 to arcuate slots 110' and 112'. Similarly, face 278 of motor cylinder barrel 140 includes a plurality of axial arranged ports 280 (FIGS. 1, 13 and 14) through which hydraulic fluid communicates from motor cylinder chambers 120 to arcuate slots 112', 114'. Thus, the cylinder barrels must be in close proximity with the arcuate orifices disposed in the motor and pump blocks to sustain a suitable hydraulic connection between the pump and motor during operation. It is desirable to retain an amount of pressurized fluid disposed between each barrel face and the block mount face, often referred to as "floating" the barrel. Floating provides a dynamic seal and contemporaneously reduces friction between the cylinder barrel and respective mount face during operation of the pump and motor mechanism.

As best seen in FIGS. 5 and 12, pump cylinder barrel 116 aligns with face 92 of pump block 170 due to end 282 of input shaft 118 being guided by a bearing fitted within bore 162 in pump block 170. Alternatively, bore 162 may include a solid press fit bearing to suitably support shaft 118. Bore 162 is generally centered about face 92' of pump block 170, and as best shown in FIGS. 14–15, bore 162 includes slot 284 axially positioned along the length of thereof. In operation, slot 284 allows excess oil to return to lower casing half 82', and additionally, acts as a hydraulic pressure relief. Otherwise, the quantity of oil trapped beneath cylinder barrel face 276 tends to "lift" cylinder barrel 116 excessively away from pump mount face 92' resulting in a detrimental loss of hydraulic pressure in the system and a corresponding loss of system efficiency. Similarly, and as best seen in FIGS. 16 and 17, bore 196 in face 94' of motor block 172 includes slot 286 to relieve excessive hydraulic pressure between motor barrel 140 and face 94' of motor block 172.

Referring to FIGS. 6, 7, 9, 13, 14, 23 and 24, shown is bearing cradle 184 integral with pump block 244 of pump and motor mechanism 88'. Bearing cradle 184 is arranged oppositely respective of face 184 of motor block 172. In operation, motor barrel 140 rotates about motor mount face 94' and pistons 142, within each chamber 120, displace fluid dependant on the tilt of thrust bearing 186. The outermost extent 288 of each piston 142 contacts first plate 124 of thrust bearing 186 creating a ring of contact, preferably centered on thrust bearing 186 to provide a substantially uniform distribution of force through thrust bearing 186.

Referring to FIGS. 23 and 24, the arrangement between thrust bearing 186 and bearing cradle 186 will be described. Thrust bearing 186, includes the pair of annular plates 124, 125, a plurality of ball bearings 128 between the plates and retaining ring 290 to retain ball bearings 128 therein. Customarily, plates 124 and 125 of thrust bearing 186 have similar inner surface 242 dimensions and a similar outer surface 294 dimension. In operation, plate 124 contacts annular face 252 of bearing cradle 184, remaining substantially stationary, while plate 125 rotates as outermost extents 288 of pistons 142 are urged against plate 125. Thrust bearing 186, and specifically plate 124, is restrained from downward and side to side movement by a raised semicircular shoulder portion 296 of bearing cradle 184 (FIGS. 13, 14, and 24). Additionally, thrust bearing 186 is restrained from movement in an upward direction, along annular face 252, by stop member 258. Stop member 258 is a stationary threaded fastener having outer head portion 298 contacting inner surface 292 of plate 124 of thrust member 186. Stop member 258 threads into threaded hole 256 within bearing cradle 184 (FIGS. 13, 14, and 24). Hole 256 extends into bearing cradle 184 and is generally axially aligned with pistons 142 in motor barrel 140. Stop member 258 lockingly engages threaded hole 256 so that the stop member can be threaded to a suitable depth and thereafter sustain a stationary position so that operational vibration will not affect stop member position. Retaining bearing 186 in this manner eases assembly and reduces cost.

The present invention hydrostatic transaxle 8 is "modular" meaning common axle module 12 connected to left-hand hydrostatic transmission 10 defines left-hand controlled transaxle 8, as shown in FIG. 25. Alternatively, by inverting common axle module 12 and attaching right hand controlled hydrostatic transmission 11, right hand controlled transaxle 9 is formed (FIG. 27). Right hand transaxle 9 operates identically to left hand transaxle 8 and transaxle 9 differs only in orientation, i.e., the brake handle is on the left and the control lever is on the right. Common axle module 12, readily adaptable to two alternate transmissions, significantly increases a manufacture's product line without a concomitant increase in the number of stocked components.

Referring to FIGS. 26 and 28, left-hand controlled transaxle 8 includes axle casing 18 and transmission casing 78. Axle casing 18 defines two substantially mirror image casing halves 21, 25 fastened together by a plurality of bolts 15 (FIG. 28). Referring to FIGS. 25, 26 and 28, each casing half 21, 25 includes respective stiffening ribs 27, 35 and gusset 29 to provide suitable support and stiffness to support axles 20, 22, reduction gearing. and differential mechanism (FIGS. 1 and 10). In operation, axles 20 and 22 are exposed to significant levels of stress and torque common to the rigorous usage and loading of typical agricultural usage of transaxle 8. Therefore, each casing half 21, 25 comprising suitably stiff axle casing 18, is provided with gusset 29 integrally formed with respective stiffening ribs 27, 35. As best seen in FIG. 28, left hand controlled transaxle 8 possesses symmetry relative to casing parting line 33. Specifically, stiffening ribs 27 and gusset 29 on casing half 21 is a mirror image of stiffening ribs 35 and gusset 29 on casing half 25. Additionally, the size and placement of gusset 29 on casing half 21 is a mirror image of the size and placement of gusset 29 provided on casing half 25 relative to parting line 33. In a similar manner, mounting bosses 39 on casing half 21 are mirror images of mounting bosses 41 provided on casing half 25, relative to parting line 33. Since right hand transaxle 9 (FIGS. 27 and 29) differs from left hand transaxle 8 only in attachment of right hand hydrostatic transmission 11, axle module 12, and corresponding casing 18 are identical in both transaxles 8 and 9.

Referring to FIGS. 26 and 27, the method for manufacturing a plurality of left hand controlled hydrostatic transaxles and a plurality of right hand controlled hydrostatic transaxles, using the components detailed above, will be described. In a production environment, it is desirable to maintain and utilize an inventory of standardized components to thereby facilitate the manufacturing process and reduce expenses associated with using different components. The present invention provides a method for using standardized components to produce left hand and right hand controlled hydrostatic transaxles 8, 9 respectively. The present method is particularly suitable for implementation in a large scale production environment wherein it is desired to quickly and efficiently produce numbers of left hand and/or right hand controlled hydrostatic transaxles and to be able to quickly switch over from producing one type of transaxle to another.

Using the method of the present invention, an inventory of identically manufactured axle modules 12 are used to quickly and efficiently produce a large number of left hand and/or right hand controlled transaxles. Further, an inventory of left hand controlled hydrostatic transmission modules 10 and an inventory of right hand controlled hydrostatic transmission modules 11 is provided for ready availability and selection at the production facility. The availability of the inventory of identically manufactured axle modules 12, left hand hydrostatic transmission modules 10 and right hand controlled hydrostatic transmission modules 11 at the production facility, allows the manufacturer to easily select and attach the required components to quickly and efficiently produce either a left hand controlled transaxle 8 (FIG. 26) or a right hand controlled transaxle 9 (FIG. 27).

In order to produce a plurality of left hand controlled transaxles 8, the manufacturer first provides axle modules 12 from the inventory of identically manufactured axle modules. Second, the manufacturer selects left hand controlled transmission module 10 from the inventory of left hand controlled transmission modules. The manufacturer then attaches the selected components together to produce a plurality of left hand controlled transaxles 8. By continuously selecting axle modules and left hand controlled transmission modules and assembling the selected components, the manufacturer is able to quickly and efficiently produce left hand controlled hydrostatic transaxles 8 from the materials in the inventory.

When it is desired to produce a plurality of right hand controlled hydrostatic transaxles 9, the manufacturer provides the axle module 12 from the inventory of identically manufactured axle modules 12 and a plurality of right hand controlled transmission modules 11 from the inventory of right hand controlled transmission modules 11. The manufacturer then assembles the selected components into a plurality of right hand controlled transaxles 9. Again, by continuously selecting axle modules 12 and right hand controlled hydrostatic transmission modules 11 in assembling the selected components, the manufacturer is able to easily and efficiently produce right hand controlled hydrostatic transaxles 9 from the materials in the inventory.

It can be seen that the manufacturer can switch from one type of transaxle to another by simply selecting a different transmission configuration while continuing to select the axle module from the inventory of identically manufactured axle modules. Therefore, the left hand and right hand controlled hydrostatic transaxles can be easily and quickly assembled in large numbers. It can also be seen that a significant cost reduction is possible due to the standardization of the axle module thereby simplifying transaxle manufacturing and reducing the associated costs.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of manufacturing a plurality of left hand controlled hydrostatic transaxles and a plurality of right hand controlled hydrostatic transaxles, comprising the steps of:

providing a plurality of substantially identical axle modules;

providing a plurality of left hand controlled hydrostatic transmission modules adapted to connect to respective axle modules to form left hand controlled hydrostatic transaxles, and a plurality of right hand controlled hydrostatic transmission modules adapted to connect to respective axle modules to form right hand controlled hydrostatic transaxles;

attaching said plurality of left hand controlled hydrostatic transmission modules to a first quantity of said plurality of substantially identical axle modules to form a plurality of left hand controlled hydrostatic transaxles; and attaching said plurality of right hand controlled hydrostatic transmission modules a second quantity of said plurality of substantially identical axle modules to form a plurality of right hand controlled hydrostatic transaxles.

* * * * *